United States Patent
Joshi et al.

(10) Patent No.: US 11,335,119 B1
(45) Date of Patent: *May 17, 2022

(54) SPOOF DETECTION BASED ON RED-EYE EFFECTS

(71) Applicant: EyeVerify, Inc., Kansas City, MO (US)

(72) Inventors: Yash Joshi, Kansas City, MO (US); Reza R. Derakhshani, Shawnee, KS (US)

(73) Assignee: EyeVerify Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,773

(22) Filed: Aug. 2, 2021

Related U.S. Application Data

(63) Continuation of application No. 17/138,779, filed on Dec. 30, 2020, now Pat. No. 11,080,516.

(51) Int. Cl.
  *G06V 40/40* (2022.01)
  *G06V 40/16* (2022.01)
  *G06T 7/246* (2017.01)
  *G06N 20/00* (2019.01)
  *G06V 10/60* (2022.01)

(52) U.S. Cl.
  CPC .......... *G06V 40/166* (2022.01); *G06N 20/00* (2019.01); *G06T 7/246* (2017.01); *G06V 10/60* (2022.01); *G06V 40/172* (2022.01); *G06V 40/45* (2022.01); *G06T 2207/10048* (2013.01); *G06T 2207/30216* (2013.01)

(58) Field of Classification Search
  CPC .......... G06K 9/00255; G06K 9/00288; G06K 9/4661; G06K 9/00906; G06N 20/00; G06T 2207/10048; G06T 2207/30216; G06T 7/246
  See application file for complete search history.

(56) References Cited

U.S. PATENT DOCUMENTS

| | | | |
|---|---|---|---|
| 6,714,665 B1 * | 3/2004 | Hanna | G06K 9/00 382/117 |
| 9,594,969 B1 * | 3/2017 | Negi | G06K 9/00906 |

(Continued)

OTHER PUBLICATIONS

Agarwal, Rohit, Anand Singh Jalal, and K. V. Arya. "Enhanced Binary Hexagonal Extrema Pattern (EBH X EP) Descriptor for Iris Liveness Detection." Wireless personal communications 115, No. 3 (2020): 2627-2643. (Year: 2020).*

*Primary Examiner* — Carol Wang
(74) *Attorney, Agent, or Firm* — Fish & Richardson P.C.

(57) ABSTRACT

Methods, systems, and apparatus, including computer programs encoded on a computer storage medium for red eye detection are provided. In one aspect, a system includes an image acquisition device, first and second illuminators, and at least one processor. The first illuminator is arranged closer to the image acquisition device than the second illuminator. The image acquisition device is configured to capture a first facial image of a face of a subject with the first illuminator being on and the second illuminator being off and a second facial image of the face of the subject with the second illuminator being on and the first illuminator being off. The processor can process the first facial image based on the second facial image to determine whether at least one eye of the subject is live by determining that the first facial image includes a red eye reflection from the at least one eye.

20 Claims, 13 Drawing Sheets

(56) References Cited

U.S. PATENT DOCUMENTS

| | | | |
|---|---|---|---|
| 2005/0199783 A1* | 9/2005 | Wenstrand | G06F 3/013 250/214.1 |
| 2006/0139447 A1* | 6/2006 | Unkrich | H04N 13/31 348/51 |
| 2008/0024598 A1* | 1/2008 | Perlin | H04N 13/31 348/55 |
| 2008/0044063 A1* | 2/2008 | Friedman | A61B 3/14 382/117 |
| 2008/0049185 A1* | 2/2008 | Huffman | A61B 3/113 351/206 |
| 2008/0267600 A1 | 10/2008 | Omi | |
| 2009/0016574 A1* | 1/2009 | Tsukahara | G06K 9/00906 382/117 |
| 2010/0077421 A1* | 3/2010 | Cohen | G07C 9/37 725/10 |
| 2010/0299530 A1* | 11/2010 | Bell | G06F 21/32 713/186 |
| 2012/0075452 A1* | 3/2012 | Ferren | G06F 3/04886 348/78 |
| 2014/0085451 A1* | 3/2014 | Kamimura | H04N 5/23219 348/78 |
| 2015/0294464 A1* | 10/2015 | Kim | G06K 9/00597 382/117 |
| 2016/0196475 A1* | 7/2016 | Martin | G06K 9/00221 382/117 |
| 2017/0091550 A1* | 3/2017 | Feng | G06T 7/38 |
| 2017/0124394 A1* | 5/2017 | Thavalengal | G06K 9/6289 |
| 2017/0323167 A1* | 11/2017 | Mapen | G06K 9/00604 |
| 2018/0034812 A1* | 2/2018 | Rahman | G06K 9/00604 |
| 2018/0053044 A1* | 2/2018 | Su | G06T 7/00 |
| 2018/0158269 A1* | 6/2018 | Friedman | G06K 9/00228 |
| 2018/0173979 A1* | 6/2018 | Fan | G06K 9/2036 |
| 2018/0173980 A1* | 6/2018 | Fan | G06K 9/2027 |
| 2019/0130171 A1* | 5/2019 | Alameh | G01J 5/0025 |
| 2020/0311238 A1* | 10/2020 | Ackerman | G06F 21/32 |

\* cited by examiner

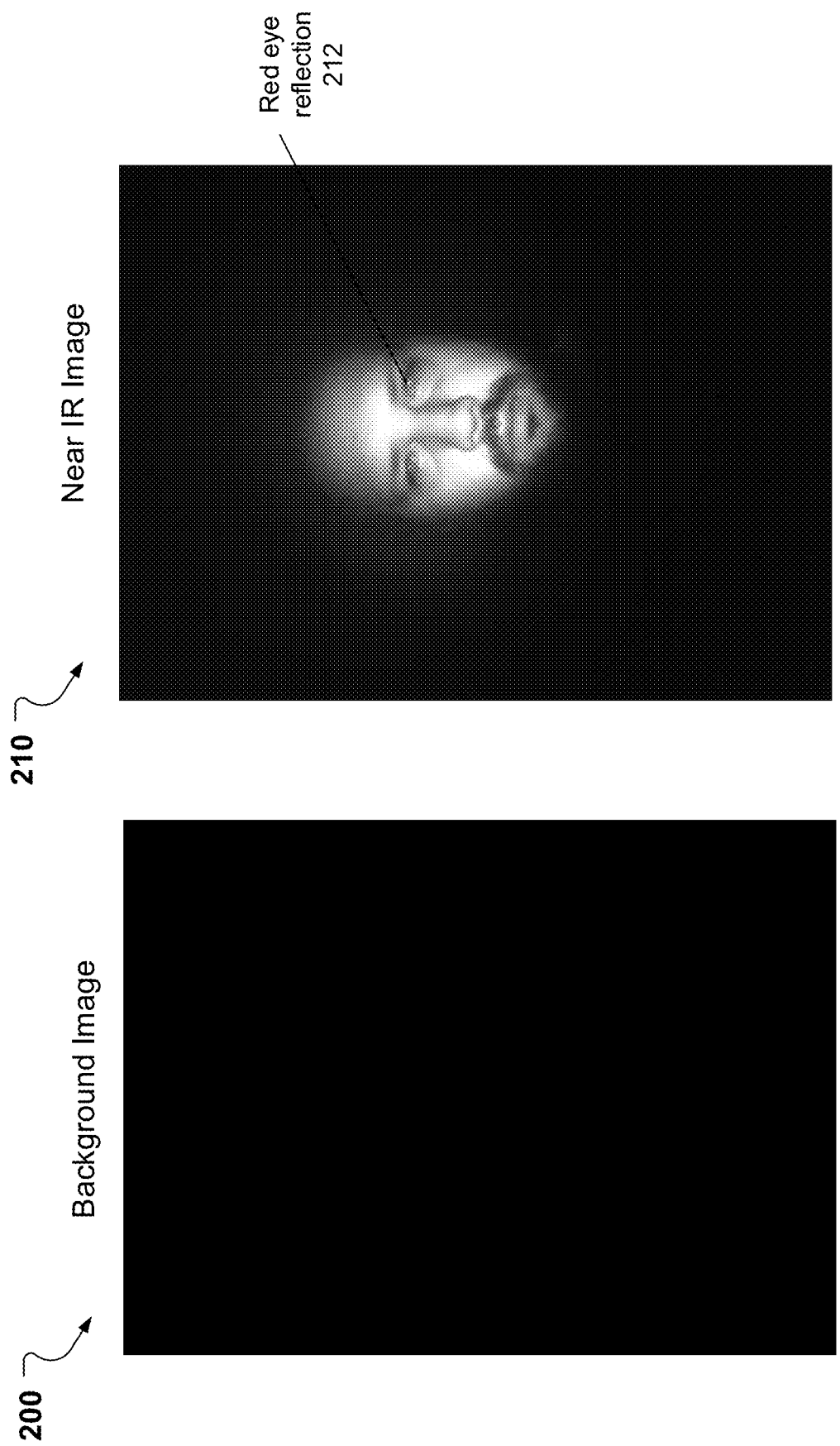

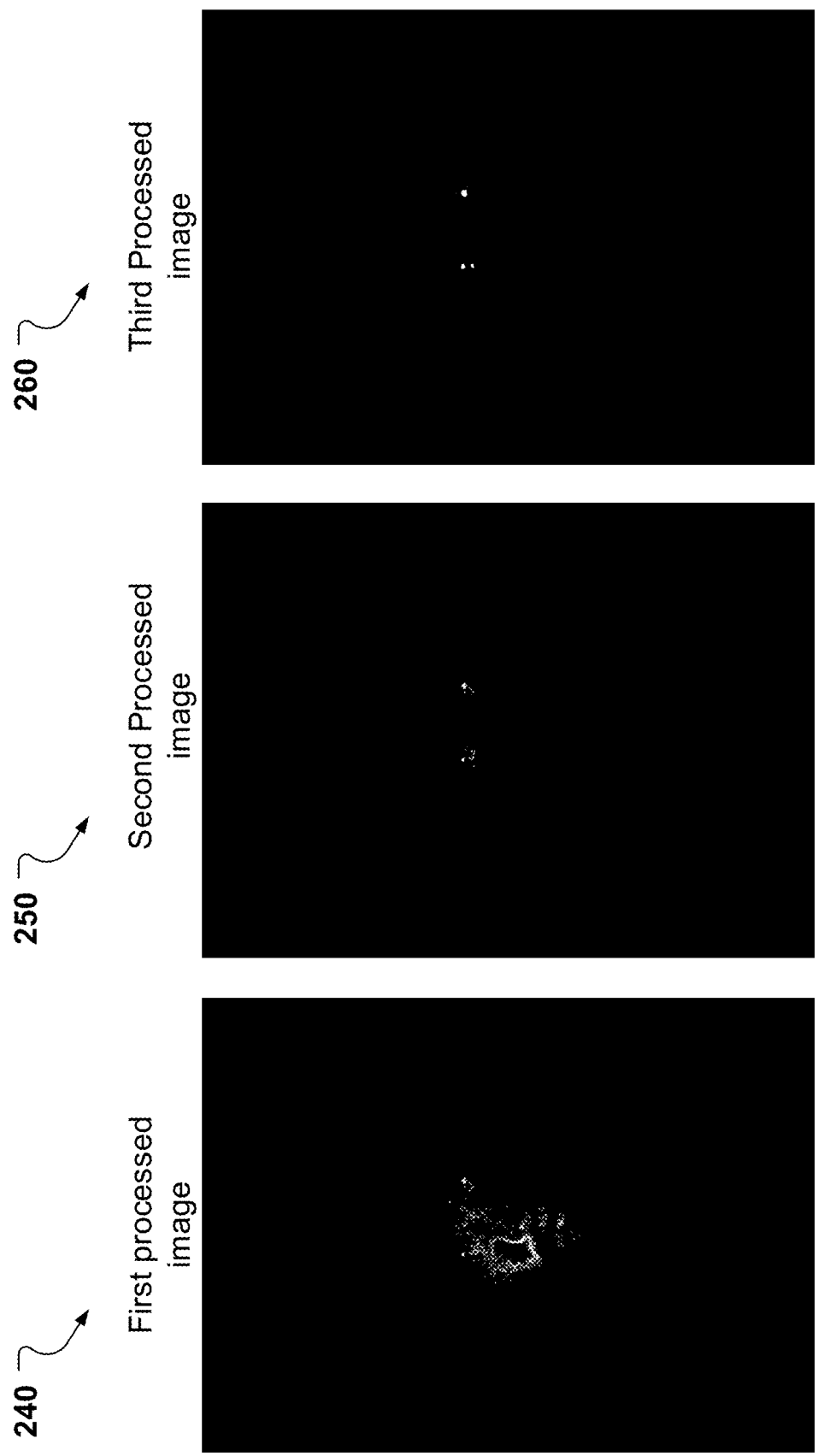

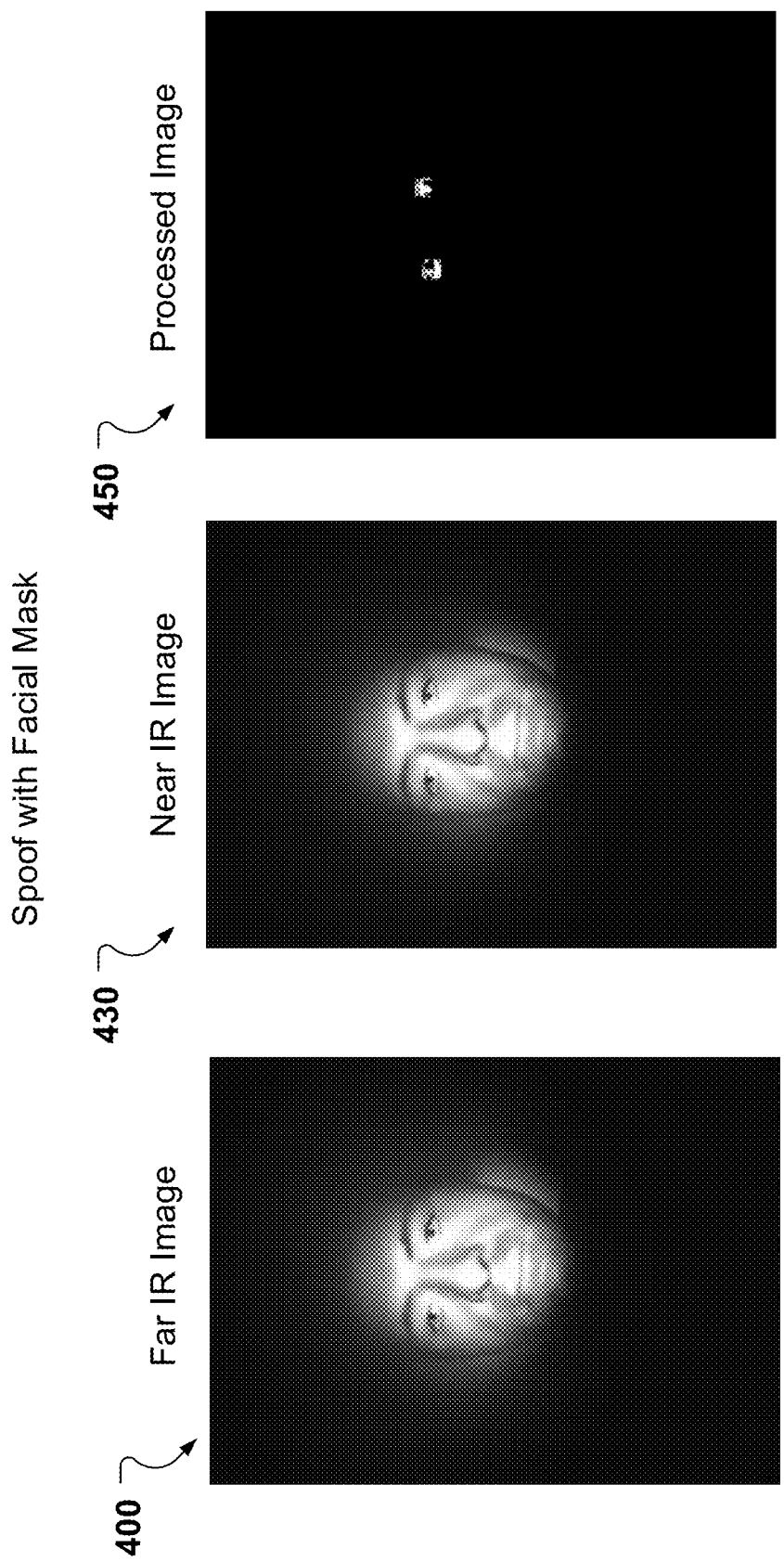

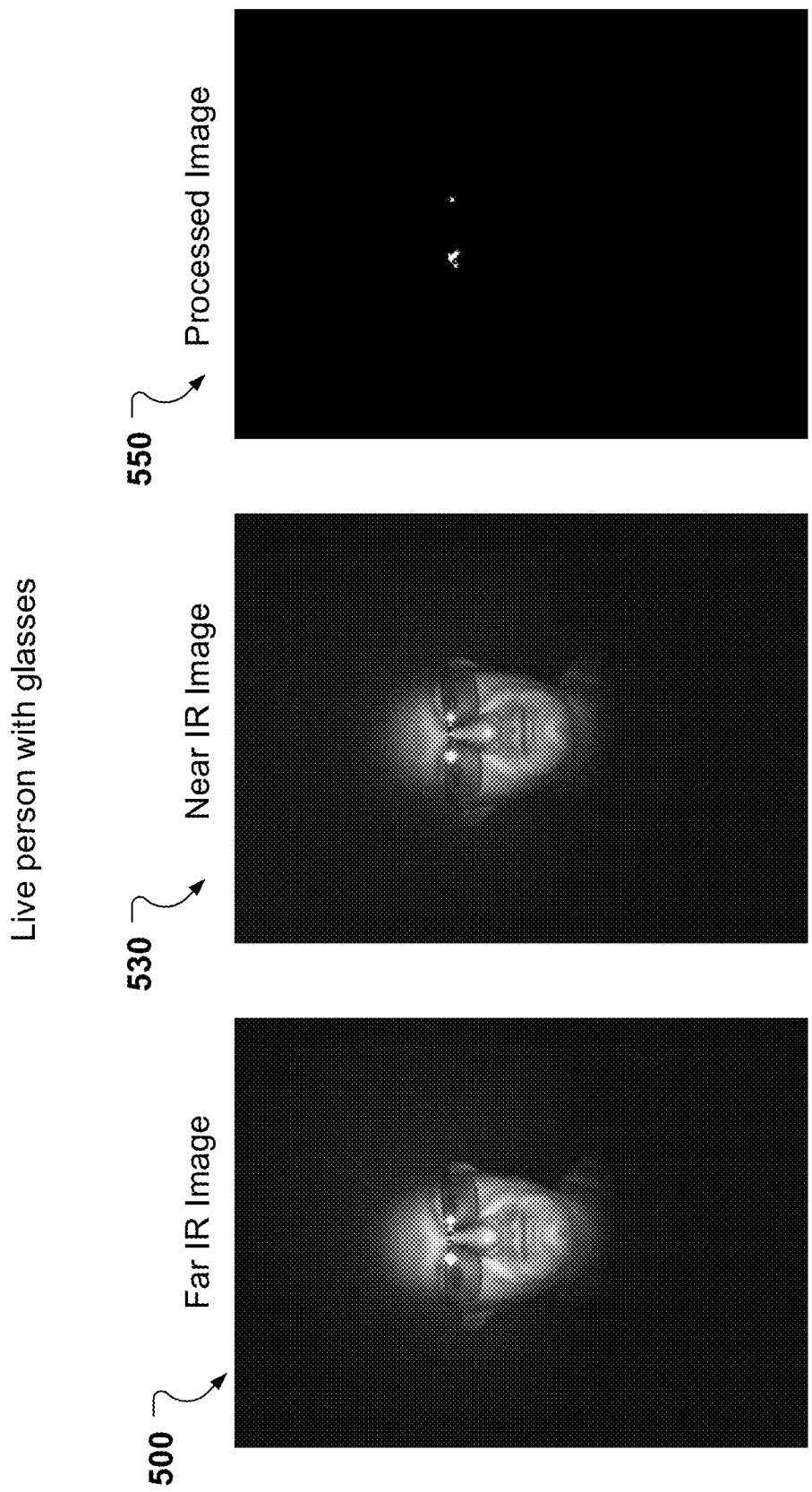

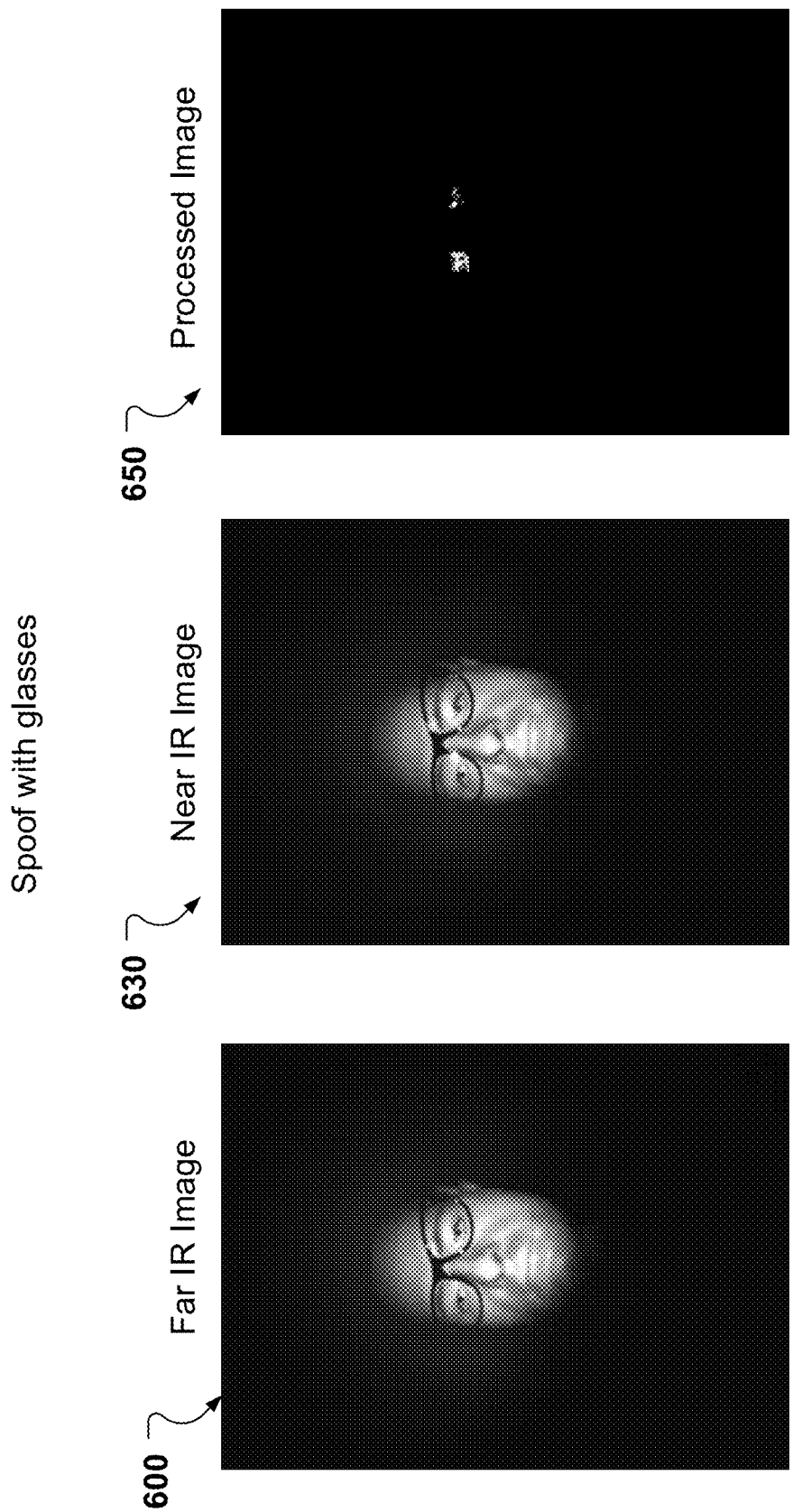

SPOOF DETECTION BASED ON RED-EYE EFFECTS

CROSS-REFERENCE TO RELATED APPLICATIONS

This application claims priority to U.S. patent application Ser. No. 17/138,779, filed on Dec. 30, 2020, which is hereby incorporated by reference its entirety.

TECHNICAL FIELD

The present disclosure generally relates to image capture devices or systems, e.g., for biometric authentication.

BACKGROUND

Systems incorporating a biometric identification technology such as face recognition or iris recognition often include a camera that captures an image of a user. The captured image can be then processed to authenticate the user using the biometric identification technology.

SUMMARY

Described embodiments of the subject matter can include one or more features, alone or in combination.

One aspect of the present disclosure features a system including: an image acquisition device, a first illuminator arranged at a first distance from a lens of the image acquisition device, a second illuminator arranged at a second distance from the lens of the image acquisition device, the second distance being larger than the first distance, and at least one processor. The image acquisition device is configured to capture (i) a first facial image of a face of a subject with the first illuminator being on and the second illuminator being off, and (ii) a second facial image of the face of the subject with the second illuminator being on and the first illuminator being off. The at least one processor is configured to: process the first facial image based on the second facial image to determine whether the first facial image comprises a red eye reflection from at least one eye of the subject, and in response to determining that the first facial image comprises a red eye reflection from at least one eye of the subject, determine that the at least one eye of the subject is live. The process can be further configured to initiate an authentication process for the subject in response to determining that at least one eye of the subject is live. At least one of the first facial image or the second facial image can be an ocular image or an image of a part of the face including the at least one eye.

In some embodiments, the image acquisition device includes an infrared camera, and the first illuminator includes at least one first infrared light emitting element configured to emit light in an infrared range, and the second illuminator comprises at least one second infrared light emitting element configured to emit light in the infrared range.

In some embodiments, the system further includes: a third illuminator including at least one third light emitting element configured to emit light in a visible range and a second image acquisition device configured to capture a third facial image of the subject with the third illuminator being on and the first and second illuminators being off, the third facial image being in the visible range. The third facial image can be also captured with natural existing light without an illuminator's illumination. The processor can be configured to process the third facial image to identify an eye center of at least one eye of the subject and generate a mask image comprising a reference eye center region corresponding to the eye center of the at least one eye of the subject.

In some embodiments, processing the first facial image based on the second facial image includes: determining that the face and/or at least one eye of the subject is in motion, registering the second facial image with the first facial image in response to determining that the face and/or the at least one eye of the subject is in motion, and subtracting the registered second facial image from the first facial image.

In some embodiments, the image acquisition device is configured to capture a third facial image with the first illuminator and the second illuminator being off, and processing the first facial image based on the second facial image can include: subtracting a sum of the second facial image and the third facial image from the first facial image.

In some embodiments, the processor is configured to: control the image acquisition device, the first illuminator, and the second illuminator, such that the first facial image, the second facial image, and the third facial image are sequentially captured within a predetermined time period.

In some embodiments, the system further includes a light barrier arranged between the image acquisition device and the first illuminator and configured to block light emitted from the first illuminator to the image acquisition device.

In some embodiments, the system further includes a depth sensor configured to detect a subject distance between the face of the subject and the image acquisition device. The processor can be configured to adjust one or more parameters of at least one of the image acquisition device or the first illuminator based on the subject distance.

In some embodiments, a first ratio between the first distance and a subject distance between the face of the subject and the image acquisition device is smaller than a predetermined ratio, and a second ratio between the second distance and the subject distance is larger than the predetermined ratio.

In some embodiments, the system further includes a display device presenting a user interface. The processor can be configured to adjust a brightness of the user interface of the display device to thereby control a pupil dilation such that an intensity of the red eye reflection of the at least one eye of the subject in the first facial image satisfies a predetermined threshold condition. For example, an increased brightness can cause increased pupil constriction (or decreased pupil dilation), and a reduced brightness can cause decreased pupil constriction (or increased pupil dilation). In some embodiments, the system includes an ambient light sensor configured to detect a bright environment that can reduce the red eye effect due to pupil constriction, and the detection of the ambient light sensor can be used for algorithm threshold adjustments or issuing a failure to capture.

In some embodiments, the processor is configured to determine that the first facial image comprises the red eye reflection using a trained machine learning model.

In some embodiments, the image acquisition device is configured to capture a third image when the first illuminator is on and the second illuminator is off, and the processor is configured to: determine that the third image comprises a first image portion corresponding to a first face of a first subject and a second image portion corresponding to a second face of a second subject, determine that the first image portion comprises a first red eye reflection in at least one eye of the first subject and the second image portion comprises a second red eye reflection in at least one eye of the second subject, and in response to determining that the first red eye reflection is larger than the second red eye reflection, determine the first subject to be a target subject for authentication.

In some embodiments, the processor is configured to determine whether the subject is authenticated at least partially based on one or more other facial landmarks of the face of the subject. For example, the other facial landmarks can include are eyebrows, nose, mouth, jawline, or any other salient region of the face.

Another aspect of the present disclosure features a method including: controlling, by at least one processor, an image acquisition device to capture a first facial image of a face of a subject with a first illuminator being on and a second illuminator being off, the first illuminator and the second illuminator being arranged with first and second distances away from the image acquisition device, the second distance being larger than the first distance; controlling, by the at least one processor, the image acquisition device to capture a second facial image of the face of the subject with the second illuminator being on and the first illuminator being off; processing, by the at least one processor, the first facial image based on the second facial image to determine that the first facial image includes a red eye reflection of at least one eye of the subject; and in response to determining that the first facial image comprises the red eye reflection of the at least one eye of the subject, determining that the at least one eye of the subject is live initializing, by the at least one processor, an authentication process for the subject. The method can further include: initiating an authentication process for the subject in response to determining that the at least one eye of the subject is live. At least one of the first facial image or the second facial image can be an ocular image or an image of a part of the face including the at least one eye.

In some embodiments, the method further includes: controlling, by the at least one processor, the image acquisition device to capture a third image with the first illuminator being off and the second illuminator being off. Processing the first facial image based on the second facial image can include subtracting a sum of the second facial image and the third facial image from the first facial image.

In some embodiments, processing the first facial image based on the second facial image can include at least one of: performing an image threshold operation on the processed first facial image to get a binary image, obtaining a mask image including a reference eye center region corresponding to the at least one eye of the subject and eliminating at least one non-eye-center region in the processed first facial image using the mask image, or performing a morphological operation on the processed first facial image to reduce noise.

In some embodiments, processing the first facial image based on the second facial image comprises generating a red eye detection image based on the first facial image. The method can include: determining that the at least one eye of the subject is live by determining that the first facial image comprises the red eye reflection of the at least one eye of the subject based on the red eye detection image.

In some embodiments, the red eye detection image is a binary image. The at least one eye includes a left eye and a right eye, and the reference eye center region includes a reference left eye center region corresponding to the left eye and a reference right eye center region corresponding to the right eye. Determining that the at least one eye of the subject is live can include: determining a left white pixel area close to a left eye center region in the red eye detection image that corresponds to the left reference eye center region, determining a right white pixel area close to a right eye center region in the red eye detection image that corresponds to the right reference eye center region, and determining that at least one of the left and right white pixel areas has a size smaller than a predetermined size threshold.

In some embodiments, determining that at least one eye of the subject is live includes: in response to determining that only one of the left and right white pixel areas has the size smaller than the predetermined size threshold and that the one of the left and right white pixel areas matches with a corresponding one of the left and right eye center regions, determining that a corresponding eye of the left and right eyes is live.

In some embodiments, determining that the at least one eye of the subject is live includes: in response to determining that each of the left and right white pixel areas has the size smaller than the predetermined threshold, determining a ratio of a total number of white pixels in the left and right white pixel areas and a total number of black pixels in the red eye detection image, determining that the ratio is smaller than a predetermined ratio threshold, determining a red eye detection angle between the left and right white pixel areas, determining a reference angle between the reference left eye center region and the reference right eye center region in the mask image, and determining that the left and right eyes of the subject are live in response to determining that the red eye detection angle matches the reference angle.

Another aspect of the present disclosure features a system including: an image acquisition device, a first illuminator arranged at a first distance from a lens of the image acquisition device, a second illuminator arranged at a second distance from the lens of the image acquisition device, the second distance being larger than the first distance, and at least one processor. The image acquisition device is configured to capture (i) a first facial image of a face of a subject with the first illuminator being on and the second illuminator being off, and (ii) a second facial image of the face of the subject with the second illuminator being on and the first illuminator being off. The at least one processor configured to: process the first facial image based on the second facial image to generate a red eye detection image for detecting whether the first facial image includes a red eye reflection of at least one eye of the subject; determine, based on the red eye detection image, whether the at least one eye of the subject is live. The at least one processor can be further configured to: in response to determining that the at least one eye of the subject is live, initiate an authentication process for the subject.

In some embodiments, the second facial image includes zero red eye reflection of eyes of the subject. In some embodiments, at least one of the first facial image or the second facial image is an ocular image or an image of a part of the face including the at least one eye.

In some embodiments, each of the first and second facial images includes a respective corneal reflection corresponding to the at least one eye, and the red eye detection image includes no information corresponding to the respective corneal reflections of the first and second facial images. The system can be configured such that the red eye reflection is substantially stronger than the respective corneal reflection in the first facial image.

In some embodiments, the image acquisition device includes an infrared camera, and the first illuminator includes at least one first infrared light emitting element configured to emit light in an infrared range, and the second illuminator includes at least one second infrared light emitting element configured to emit light in the infrared range.

In some embodiments, the first illuminator includes a plurality of light emitting elements arranged around the lens of the image acquisition device.

In some embodiments, the system further includes: a third illuminator that includes at least one third light emitting element configured to emit light in a visible range; and a second image acquisition device configured to capture a third facial image of the subject with the third illuminator being on and the first and second illuminators being off, the third facial image being in the visible range and including zero red eye reflection of the at least one eye of the subject. The processor can be configured to process the third facial image to identify an eye center of the at least one eye of the subject and generate a mask image including a reference eye center region corresponding to the eye center of the at least one eye of the subject. The processor can be configured to register the first, second, and third facial images in a coordinate system and generate the red eye detection image based on the registered first, second, and third facial images.

In some embodiments, the processor is configured to: determine that the face of the subject is in motion; register the first and second facial images in response to determining that the face of the subject is in motion; and generate the red eye detection image based on the registered first and second facial images.

In some embodiments, each of the first and second facial images includes an image of a portion of the face of the subject, the portion including at least one eye.

In some embodiments, each of the first and second facial images is captured when the subject wears a face mask with the at least one eye being uncovered.

In some embodiments, the system further includes an infrared temperature sensor configured to remotely detect a temperature of the subject in a facial area of the subject.

In some embodiments, the system further includes a light barrier arranged between the image acquisition device and the first illuminator and configured to block light (or electromagnetic radiation) emitted from the first illuminator to the image acquisition device. The light barrier can be positioned around the image acquisition device. For example, the light barrier can have a donut-like shape and be made of a light-absorbing material such as a black material.

In some embodiments, the system further include a depth sensor configured to detect a subject distance between the face of the subject and the image acquisition device when the image acquisition device captures a facial image of the subject. The processor can be configured to adjust at least one of one or more parameters of the image acquisition device or one or more parameters of the first illuminator based on the subject distance. In some embodiments, the system includes an ambient light sensor configured to detect a bright environment that can reduce the red eye effect due to pupil constriction, and the detection of the ambient light sensor can be used for algorithm threshold adjustments or issuing a failure to capture.

In some embodiments, the one or more parameters of the image acquisition device include an exposure time or a gain, and the one or more parameters of the first illuminator can include an intensity of light emitted from the first illuminator.

In some embodiments, the processor is configured to: determine an intensity of a red eye reflection in the first facial image; adjust at least one of the one or more parameters of the image acquisition device or the one or more parameters of the first illuminator based on the determined intensity of the red eye reflection in the first facial image; and control the image acquisition device and the first illuminator to capture a third facial image based on the adjusted at least one of the one or more parameters of the image acquisition device or the one or more parameters of the first illuminator.

In some embodiments, a first ratio between the first distance and a subject distance between the face of the subject and the image acquisition device is smaller than a predetermined ratio, and a second ratio between the second distance and the subject distance is larger than the predetermined ratio. In some examples, the predetermined value is about 1/20 or less.

In some embodiments, the system further includes a display device presenting a user interface. The processor can be configured to adjust a brightness of the user interface of the display device to control a pupil dilation such that an intensity of the red eye reflection of the at least one eye of the subject in the first facial image satisfies a predetermined threshold condition.

In some embodiments, the processor is configured to control the brightness of the user interface of the display device based on at least one of: a subject distance between a face of the subject and the image acquisition device, or an intensity of a red eye reflection in a previous first facial image.

In some embodiments, the image acquisition device is configured to capture a background image of the face of the subject with the first illuminator being off and the second illuminator being off, and the processor is configured to generate the red eye correction image based on the background facial image, the first facial image, and the second facial image.

In some embodiments, the processor is configured to control the image acquisition device, the first illuminator, and the second illuminator, such that the background facial image, the first facial image and the second facial image are sequentially captured within a predetermined time period.

In some embodiments, the processor is configured to register the background facial image, the first facial image, and the second facial image in a coordinate system, and generate the red eye correction image based on the registered background facial image, the registered first facial image, and the registered second facial image. In some embodiments, the registration is applied a second time at a finer grain focusing on the eyes regions.

In some embodiments, the processor is configured to generate the red eye detection image by subtracting the background facial image and the second facial image from the first facial image to obtain a first processed image, performing an image threshold operation on the first processed image to obtain a second processed image, obtaining a mask image including a reference eye center region corresponding to the at least one eye, and generating a third processed image based on the second processed image using the mask image to eliminate other non-eye-center regions in the second processed image.

In some embodiments, the image threshold operation includes an Otsu's threshold operation.

In some embodiments, the reference eye center region has a predetermined area.

In some embodiments, the processor is configured to generate the mask image based on the second facial image.

In some embodiments, the processor is configured to generate the mask image based on a facial image in a visible range captured by a second image acquisition device in the predetermined time period.

In some embodiments, the processor is configured to perform a morphological operation on the third processed image to reduce noise in the third processed image. The morphological operation includes at least one of an erosion operation or a dilation operation.

In some embodiments, the red eye detection image is a binary image. The at least one eye includes a left eye and a right eye, and the reference eye center region includes a reference left eye center region corresponding to the left eye and a reference right eye center region corresponding to the right eye. The processor can be configured to: determine a left white pixel area close to a left eye center region in the red eye detection image that corresponds to the left reference eye center region, determine a right white pixel area close to a right eye center region in the red eye detection image that corresponds to the right reference eye center region, and determine whether each of the left and right white pixel areas has a size smaller than a predetermined size threshold.

In some embodiments, the processor is configured to: in response to determining that no white pixel area in one of the left and right eye center regions in the red eye detection image, determine that the one of the left and right eye center regions is not usable for authenticating the subject, and in response to determining that only one of the left and right white pixel areas is usable for authenticating the subject, determine whether a corresponding eye of the left and right eyes is live based on whether the one of the left and right white pixel areas matches with a corresponding one of the left and right eye center regions.

In some embodiments, the processor is configured to: in response to determining that each of the left and right white pixel areas has the size smaller than the predetermined threshold, determine a ratio of a total number of white pixels in the left and right white pixel areas and a total number of black pixels in the red eye detection image, and determine whether the left and right eyes of the subject are live based on whether the ratio is smaller than a predetermined ratio threshold.

In some embodiments, the processor is configured to: in response to determining that each of the left and right white pixel areas has the size smaller than the predetermined threshold, determine a red eye detection angle between the left and right white pixel areas, determine a reference angle between the reference left eye center region and the reference right eye center region in the mask image, and determine whether the left and right eyes of the subject are live based on whether the red eye detection angle matches the reference angle.

In some embodiments, the processor is configured to: determine that the eyes of the subject are live in response to determining that the ratio is smaller than the predetermined ratio threshold and the red eye detection angle matches the reference angle, and determine that the eyes of the subject are not live in response to determining at least one of the ratio being no smaller than the predetermined ratio threshold or the red eye detection angle mismatching the reference angle.

In some embodiments, the processor is configured to determine whether the at least one eye of the subject is live using machine learning based on the red eye detection image.

In some embodiments, the image acquisition device is configured to capture a third image when the first illuminator is on and the second illuminator is off. The processor can be configured to: determine that the third image includes a first image portion corresponding to a first face of a first subject and a second image portion corresponding to a second face of a second subject, the first image portion including a first red eye reflection corresponding to the first face of the first subject and the second image portion including a second red eye reflection corresponding to the second face of the subject, generate a corresponding red eye detection image based on the third image, the corresponding red eye detection image including a first red eye center portion corresponding to the first red eye reflection and second red eye center portion corresponding to the second red eye reflection, and in response to determining that the first red eye center portion is larger than the second red eye center portion, determine the first subject to be a target subject for authentication.

In some embodiments, the processor is configured to determine the first subject to be the target subject in response to determining at least one of: the first red eye center portion being larger than a predetermined threshold, or an angle of eye centers of the first red eye center portion being smaller than a reference angle.

In some embodiments, the processor is configured to determine whether the subject is authenticated at least partially based on one or more other facial landmarks of the face of the subject.

In some embodiments, the processor is configured to authorize the subject to make a payment in response to determining that the subject is authenticated.

In some embodiments, the system is configured to be a kiosk device for facial authentication or a mobile device.

Another aspect of the present disclosure features a method including: controlling, by at least one processor, an image acquisition device to capture a first facial image of a face of a subject with a first illuminator being on and a second illuminator being off, the first illuminator and the second illuminator being arranged with first and second distances away from the image acquisition device, the second distance being larger than the first distance; controlling, by the at least one processor, the image acquisition device to capture a second facial image of the face of the subject with the second illuminator being on and the first illuminator being off; processing, by the at least one processor, the first facial image based on the second facial image to generate a red eye detection image for detecting whether the first facial image includes a red eye reflection of at least one eye of the subject; and determining, by the at least one processor, whether the at least one eye of the subject is live based on the red eye detection image. The method can further include: in response to determining that the at least one eye of the subject is live, initializing, by the at least one processor, an authentication process for the subject. The second facial image can include zero red eye reflection of eyes of the subject.

In some embodiments, the image acquisition device includes an infrared camera, and the first illuminator includes at least one first infrared light emitting element configured to emit light in an infrared range, and the second illuminator includes at least one second infrared light emitting element configured to emit light in the infrared range.

In some embodiments, the method further includes: adjusting, by the at least one processor, at least one of one or more parameters of the image acquisition device or one or more parameters of the first illuminator based on a subject distance between the face of the subject and the image acquisition device, such that an intensity of a red eye reflection in the first facial image is beyond a predetermined threshold.

In some embodiments, a first ratio between the first distance and a subject distance is smaller than a predetermined value, and a second ratio between the second distance and the subject distance is larger than the predetermined value, the subject distance being a distance between the face of the subject and the image acquisition device. The predetermined value can be 1/20 or less.

In some embodiments, the method further includes: controlling, by the at least one processor, a brightness of a user interface of a display device such that an intensity of the red eye reflection in the first facial image is beyond a predetermined threshold.

In some embodiments, the method further includes: controlling, by the at least one processor, the image acquisition device to capture a background facial image with the first illuminator being off and the second illuminator being off.

In some embodiments, processing the first facial image and the second facial image to generate the red eye detection image includes: subtracting the background facial image and the second facial image from the first facial image to obtain a first processed image, performing an image threshold operation on the first processed image to obtain a second processed image, obtaining a mask image including a reference eye center region corresponding to the at least one eye, and generating a third processed image based on the second processed image using the mask image to eliminate other non-eye-center regions in the second processed image.

In some embodiments, processing the first facial image and the second facial image to generate the red eye detection image includes: performing a morphological operation on the third processed image to reduce noise in the third processed image.

In some embodiments, determining whether the at least one eye of the subject is live includes: determining whether the at least one eye is live using a machine learning model based on the red eye detection image.

In some embodiments, the method further includes: generating, by the at least one processor, the mask image based on the second facial image.

In some embodiment, the red eye detection image is a binary image, the at least one eye includes a left eye and a right eye, and the reference eye center region includes a reference left eye center region corresponding to the left eye and a reference right eye center region corresponding to the right eye. Determining whether the at least one eye of the subject is live can include: determining a left white pixel area close to a left eye center region in the red eye detection image that corresponds to the left reference eye center region, determining a right white pixel area close to a right eye center region in the red eye detection image that corresponds to the right reference eye center region, and determining whether each of the left and right white pixel areas has a size smaller than a predetermined size threshold.

In some embodiment, determining whether the at least one eye of the subject is live includes: in response to determining that only one of the left and right white pixel areas is usable for authenticating the subject, determining whether a corresponding eye of the left and right eyes is live based on whether the one of the left and right white pixel areas matches with a corresponding one of the left and right eye center regions.

In some embodiments, determining whether the at least one eye of the subject is live includes: in response to determining that each of the left and right white pixel areas has the size smaller than the predetermined threshold, determining a ratio of a total number of white pixels in the left and right white pixel areas and a total number of black pixels in the red eye detection image, determining whether the ratio is smaller than a predetermined ratio threshold, determining a red eye detection angle between the left and right white pixel areas, determining a reference angle between the reference left eye center region and the reference right eye center region in the mask image, and determining whether the left and right eyes of the subject are live based on whether the red eye detection angle matches the reference angle.

In some embodiments, the method includes: determining that the eyes of the subject are live in response to determining that the ratio is smaller than the predetermined ratio threshold and the red eye detection angle matches the reference angle, and determining that the eyes of the subject are not live in response to determining at least one of the ratio being no smaller than the predetermined ratio threshold or the red eye detection angle mismatching the reference angle.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2A-2G illustrate captured and processed images of a process of managing red eye detection in accordance with one or more embodiments of the present disclosure.

FIGS. 4A-4C illustrate captured and processed images of spoofing with facial mask in accordance with one or more embodiments of the present disclosure.

FIGS. 5A-5C illustrate captured and processed images of a live person with glasses in accordance with one or more embodiments of the present disclosure.

FIGS. 6A-6C illustrate captured and processed images of spoofing with facial mask and glasses in accordance with one or more embodiments of the present disclosure.

Like reference numbers and designations in the various drawings indicate like elements.

DETAILED DESCRIPTION

Figure 1A:
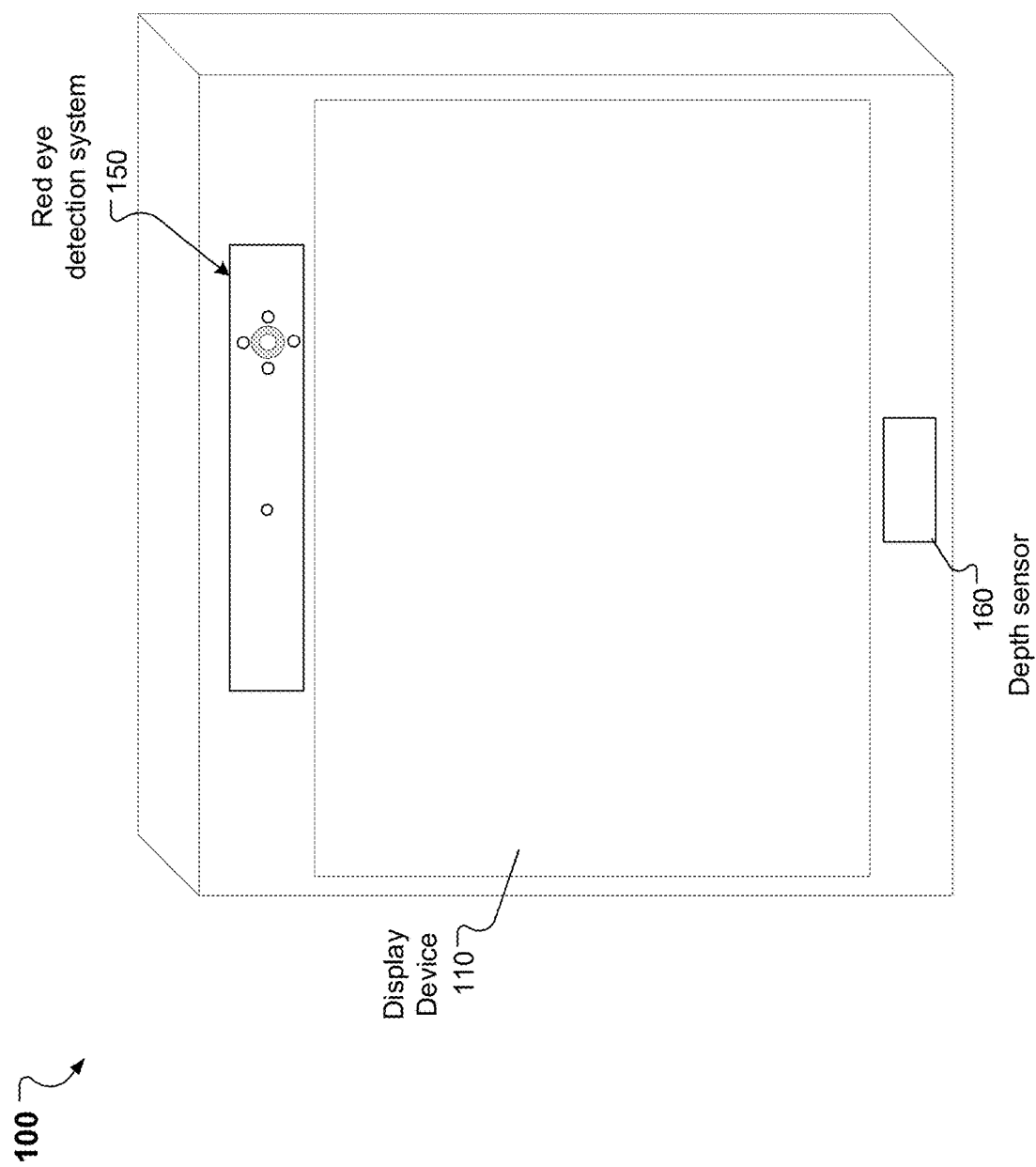
FIG. 1A is a diagram illustrating an example of a system for managing red eye detection in accordance with one or more embodiments of the present disclosure.

Biometric authentication systems can authenticate a user to a secure system based on recognizing the user's face, eye-print, iris, etc. Such biometric authentication systems involve capturing one or more images of the user and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs).

Implementations of the present disclosure provide methods, devices, systems, and techniques for managing red eye detection, e.g., for detection of eye liveness or facial liveness, which can be used for biometric authentication, anti-spoofing, anti-camera hijack, and attention detection, e.g., for kiosk devices or mobile devices (such as smartphones, tablet computers, or e-readers).

A red eye reflection is caused as a result of light reflections by a live person's retina at the back of an eye. The red eye reflection can happen in ambient low light conditions when a bright light flash is used. The bright light flashes so quickly that the eyes don't have time to respond and restrict the pupil so that less light enters the eye. This light travels through the front of the eye, and is reflected at the back of the eye because the retina has a strong blood supply. A layer of connective tissue called choroid nourishes this part of the eye and also makes this part appear a red color. An increased brightness can cause increased pupil constriction (or decreased pupil dilation), and a reduced brightness can cause decreased pupil constriction (or increased pupil dilation). When the bright light is closer to a lens of an image acquisition device, the red eye effect becomes stronger. When a ratio between the distance between the light and the lens and the distance between the person and the image acquisition device is larger than a predetermined threshold (e.g., 1/20 or less), there can be no red eye effect.

The techniques can accurately detect whether captured facial images include a red eye reflection from at least one eye of a subject. Based on a result of the detection of the red eye reflection, it can be determined whether the subject is a live person or a spoof alternative representation (e.g., a three-dimensional (3D) face mask of the live person, a photograph or image of the live person printed on paper or displayed on a high definition display device). If the subject is a spoof, further processing can be avoided or prevented. If the subject is a live person, further processing (e.g. authentication of the subject) can be performed, e.g., together with detection of other facial landmarks of the face of the subject. Services can be provided (or denied) to the subject based on the authentication. A facial landmark is a landmark used to localize and represent salient regions of the face, such as eyes, eyebrows, nose, mouth, or jawline.

In some embodiments, the systems include a red eye detection system having two illuminators (or illumination sources) arranged with different distances from an image acquisition device, e.g., a camera. A first illuminator is set closer with a first distance from a lens of the image acquisition device, such that, when the first illuminator is on and the second illuminator is off, a first facial image of a subject captured by the image acquisition device can include a red eye reflection of at least one eye of the subject if the subject is a live person or include little or include no red eye reflection if the subject is a spoof alternative representation. A second illuminator is set farther with a second distance from the lens of the image acquisition device to avoid red eye generation, such that, when the second illuminator is on and the first illuminator is off, a second facial image of the subject captured by the image acquisition device includes little or zero red eye reflection of eyes of the subject. At least one of the first facial image or the second facial image can be an ocular image or an image of a part of the face including the at least one eye.

For a spoof, non-red-eye components are uniformly spread, while for a live person, the red eye reflection is a dominant component. These characteristics, including non-red-eye components being uniformly spread for a spoof and red eye reflection being a dominant component for a live person, can be used to identify the live person from the spoof. In some embodiments, the techniques include processing the first facial image based on the second facial image, e.g., by subtraction, to detect whether a residue of the first facial image, e.g., a differential image after subtracting the second facial image from the first facial image, includes the red eye reflection. In some cases, a custom mask based on eye centers of the subject can be applied on the residue to further eliminate any non-red-eye component in the image, which enables to improve a signal to noise ratio for the red eye detection, thereby achieving more accurate and reliable liveness detection.

Human skin absorbs more infrared (IR) light and reflects less as compared to a spoof (e.g., a three-dimensional (3D) face mask of the live person). The reflections from the spoof are uniformly spread in contrast to humans, which can be used as a spoof indicator. For example, less nuanced and uniform reflectivity of spoofs for IR light can be used for spoof detection. In some embodiments, the first illuminator and the second illuminator can be infrared (IR) illuminators, e.g., IR light emitting diodes (LEDs). The image acquisition device can be an infrared (IR) camera. In such a way, the techniques can use a number of cheap or inexpensive IR illuminators along with associated controllers to an IR camera in the red eye detection system, plus image processing software, e.g., computer vision algorithms, that can be executed either on the red eye detection system or on a remote server that can have more resources, a larger capacity, a higher processing power, a larger memory, and/or faster responsiveness.

In some embodiments, to arrange the illuminators and the image acquisition devices in the system, the distances between the illuminators and the image acquisition device are determined based on a threshold of a subject distance between the face of the subject and the image acquisition device. The threshold can be set to be a minimum of the subject distance, e.g., a distance with the face of the subject adjacent to the image acquisition device. In some examples, a ratio between the first distance and the subject distance is larger than a predetermined ratio, and a ratio between the second distance and the subject distance is smaller than the predetermined ratio. The predetermined ratio can be about 1/20 or less.

In some embodiments, based on the subject distance, one or more parameters or characteristics of the image acquisition device (e.g., camera exposure or gain) or one or more parameters or characteristics of the illuminators (e.g., an illuminance strength) can be adjusted for the red eye detection. For example, the red eye effect varies from subject to subject. For some subjects, the red eye is faint. To not miss the faint red eye effect, exposure/gain bracketing and/or change in IR light intensity can be implemented. In some examples, the red eye detection system can use a plurality of images with different exposure/gain/light settings to ensure that red eye is not missed from a live subject.

In some embodiments, a display device, e.g., a light crystal display (LCD), is arranged adjacent to the image acquisition device. The display device presents a user interface (UI). The display device's brightness can be adapted by changing the UI to avoid pupil constriction that reduces the red eye effect. A darker UI can be used to reduce the pupil contraction due to the display device's brightness and thus improve the red eye intensity in the captured image. Also, the display device can absorb the IR and reflect back almost nothing resulting in a black screen in the IR spectrum. Thus, anything on the screen can be invisible in IR. In some embodiments, the systems include an ambient light sensor configured to detect a bright environment that can reduce the red eye effect due to pupil constriction. The detection of the ambient light sensor can be used for algorithm threshold adjustments or issuing a failure to capture.

Reflections from eye glasses can interfere with the red eye effect, and the red eye detection system can identify and reduce (or eliminate) such reflections to avoid live rejection and spoof accepting. For example, the red eye detection system can use adaptive algorithms to mitigate the glasses reflections or adjust algorithm parameters.

The red eye detection system can also be used to count a number of eyeballs/subjects staring at the image acquisition device within a capture range and/or determine who is a target subject for authentication. The techniques can also use a challenge-response scheme against digital replay and camera hijack attacks.

Various implementations described herein can provide one or more of the following advantages. The technologies described herein can accurately detect spoofs from live persons from captured images based on red eye detection. The technologies can be applied where images of only part of a face including at least one eye are captured. For example, when a subject wears a face mask with at least one eye being uncovered, the technologies can still detect a spoof from a live person from captured facial images based on red eye detection. Also, by allowing a biometric authentication system to discriminate between an image of a live person and an image of a spoof alternative representation, additional processing can be preemptively terminated, thereby creating an additional layer of security, which can also improve response time and conserve resources. The reliability and/or security of the biometric authentication system can be also improved. Additionally, the technologies allow for implementing a spoof detection system while reducing requirements for expensive hardware. This in turn in some cases, can reduce costs associated with the underlying biometric authentication system.

Figure 1B:
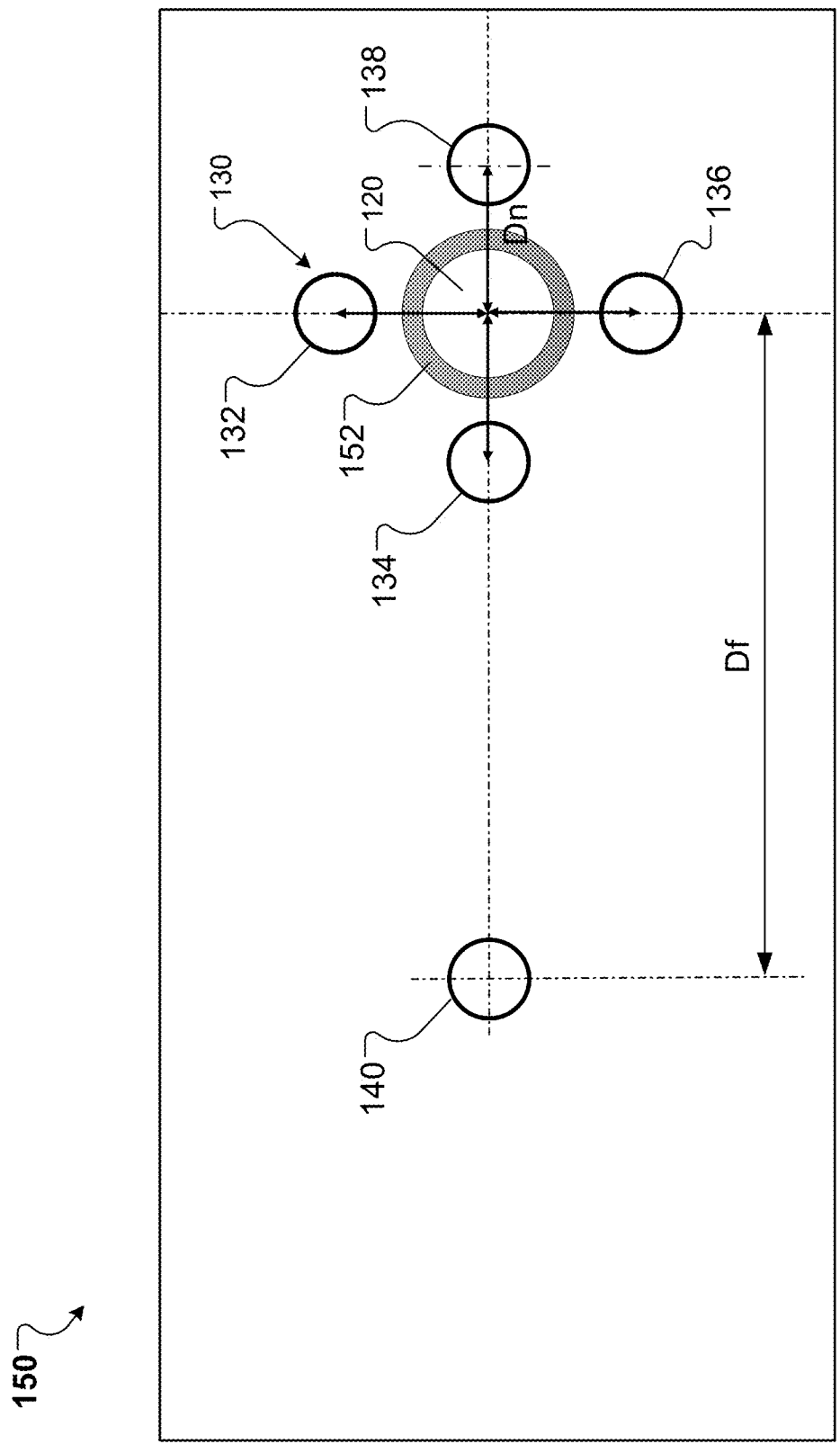
FIG. 1B is a diagram illustrating an example of an image acquisition device with illuminators at different distances in accordance with one or more embodiments of the present disclosure.
Figure 1C:
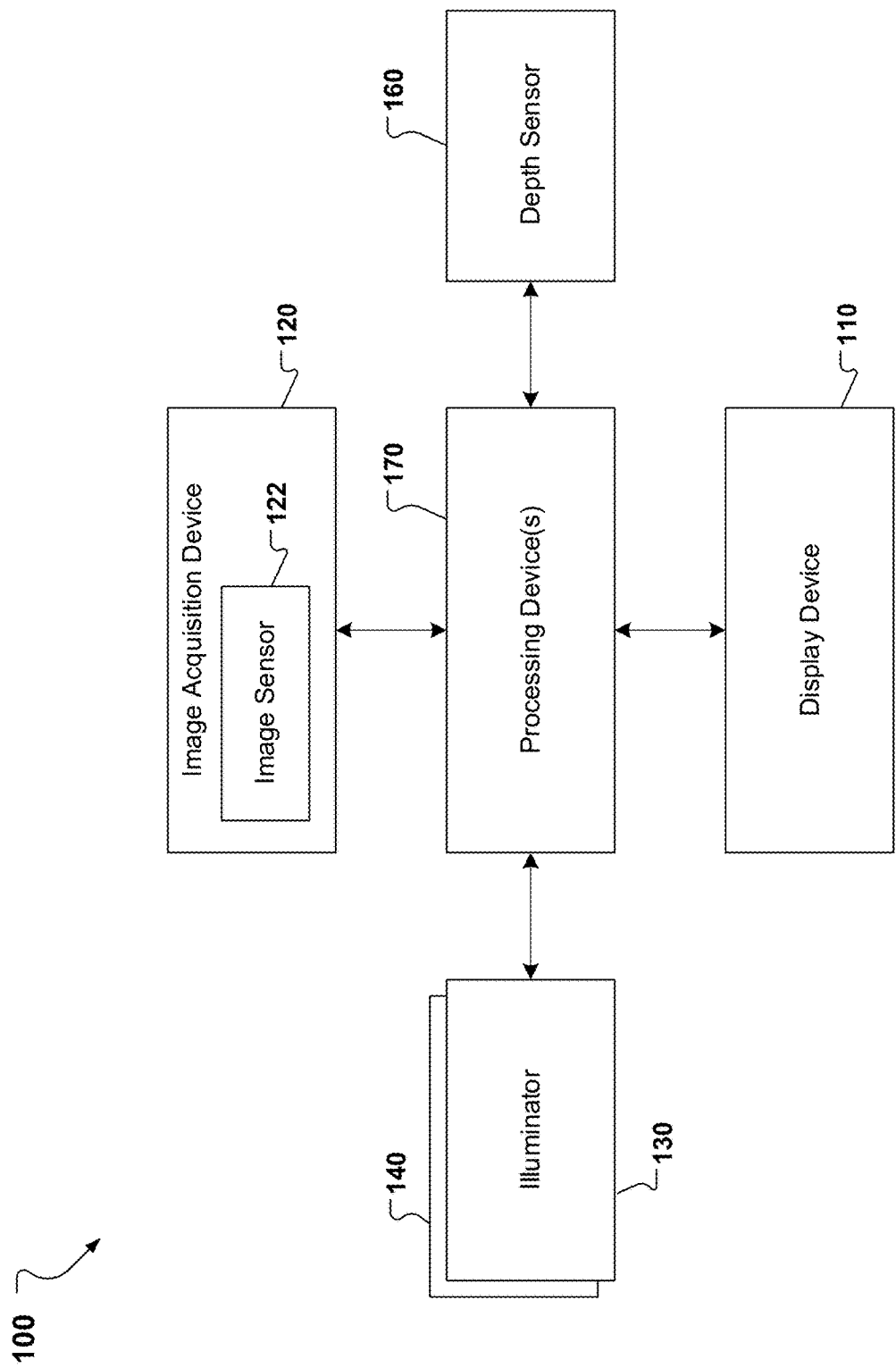
FIG. 1C is a diagram illustrating components in the system of FIG. 1A in accordance with one or more embodiments of the present disclosure.

FIGS. 1A-1C illustrate an example of a system 100 for managing red eye detection in accordance with one or more embodiments of the present disclosure. The system 100 is an example environment to which a biometric authentication system can be deployed. The system 100 can be a kiosk-type device (or machine) or a mobile device. The system 100 can be used for various purposes that require authenticating users via one or more biometric authentication processes. For example, the system 100 can include an automated teller machine (ATM) that allows a user to withdraw money from a bank account. In another example, the system 100 can be deployed at a restaurant or a fast-food outlet, and allow a user to order and pay for food. The system 100 can also be deployed at an entry point (e.g., at the gate of an arena or stadium) to authenticate entrants prior to entering the venue. In general, the system 100 can be deployed at various types of locations to authenticate users interactively, or even without any active participation of the users.

In some embodiments, the system 100 can include one or more components that support a biometric authentication system. For example, the system 100 can include a red eye detection system 150 that includes an image acquisition device 120 and at least two illuminators (or illumination sources) 130 and 140, as illustrated in FIG. 1B. Each illuminator 130, 140 can include one or more light emitting elements, e.g., light emitting diodes (LEDs). An illuminator can be in an activated state or a deactivated state. In the activated state, the illuminator is configured to emit light. In the deactivated state, the illuminator is configured to not emit light. An illuminator can be "on", i.e. in the activated state, or "off", i.e., in the deactivated state.

In some examples, as illustrated in FIG. 1B, the first illuminator 130 includes four light emitting elements 132, 134, 136, 138 that can be arranged, e.g., evenly, around the image acquisition device 120. The second illuminator 140 includes one light emitting element positioned along a direction away from the image acquisition device 120 and the light emitting elements 134, 138. While the example in FIGS. 1A and 1B shows only the first illuminator 130 includes four light emitting elements and the second illuminator 140 includes one light emitting element, various other configurations are also possible. For example, the first illuminator 130 can include one or more light emitting elements, and the second illuminator 140 can include two or more light emitting elements. The second illuminator 140 and the image acquisition device 120 can be positioned along a direction different from a direction between the first illuminator 130 and the image acquisition device 120.

The first and second illuminators 130 and 140 are spatially separated from one another and are arranged with different distances from the image acquisition device 120, e.g., from a center of the image acquisition device 120 such as a center of a lens. For example, a first distance between a center of each light emitting element 132, 134, 136, 138 and the center of the image acquisition device 120, e.g., along an axis of the image acquisition device 120, is represented by Dn, and a second distance between a center of the second illuminator 140 and the center of the image acquisition device 120 is represented by Df. The first illuminator 130 is arranged closer to the image acquisition device 120 than the second illuminator 140, i.e., Dn<Df, such that, when the first illuminator is on and the second illuminator is off, a first facial image of a subject captured by the image acquisition device can include a red eye reflection of at least one eye of the subject if the subject is a live person or include little or include no red eye reflection if the subject is a spoof alternative representation, and when the second illuminator is on and the first illuminator is off, a second facial image of the subject captured by the image acquisition device includes little or zero red eye reflection of eyes of the subject.

In some embodiments, the distances between the illuminators 130, 140 and the image acquisition device 120 are determined based on a threshold of a subject distance between the face of the subject and the image acquisition device 120. The threshold can be set to be an estimation or a minimum of the subject distance, e.g., a distance with the face of the subject adjacent to the image acquisition device. In a particular example, the first distance Dn is about 1 centimeter (cm), and the second distance Df is about 10 cm. In some examples, a ratio between the first distance Dn and the subject distance is larger than a predetermined ratio, and a ratio between the second distance Df and the subject matter is smaller than the predetermined ratio. The predetermined ratio can be about 1/20 or less.

In some embodiments, each of the first illuminator 130 and the second illuminator 140 is an infrared illuminator, e.g., including one or more IR LEDs. Each light emitting element in the first and second illuminator 130, 140 can be controlled to generate electromagnetic radiation patterns or sequences at an infrared wavelength range, for example, including an infrared spectrum of about 700 to 1400 nm range. The image acquisition device 120 can be an IR camera configured to capture an IR image of a subject when the first illuminator 130 or the second illuminator 140 illuminates IR light on the subject.

In some embodiments, the system 100 can include a third illuminator (not shown here) configured to illuminate light at a visible wavelength range that can include a visible spectrum of about 400-700 nm. The system 100 can include a second image acquisition device (not shown here) configured to capture a facial image of a subject when the third illuminator is on. For example, the second image acquisition device can be an RGB camera. As discussed with further details below, the second image acquisition device can capture a facial image of a subject when the third illuminator is on within a same time period, in which the image acquisition device 120 captures a third facial image of the subject when one of the first illuminator 130 and the second illuminator 140 is on. As the third facial image captured by the second image acquisition device is in the visible wavelength range, the third facial image can include zero red eye reflection. The third facial image, e.g., a RGB image, can be processed to determine an eye center of at least one eye of the subject and to generate a mask image including a reference eye center region corresponding to the eye center of the at least one eye of the subject. Before the processing, the third facial image can be registered with respect to the first facial image and/or the second facial image, e.g., in the same coordinate system. The third facial image can be also used to determine one or more other facial landmarks for biometrical authentication.

In some embodiments, as illustrated in FIG. 1B, the red eye detection system 150 includes a light barrier 152 arranged between the image acquisition device 120 and the first illuminator 130. The light barrier 152 is configured to block or avoid light, e.g., IR light, emitted from the first illuminator 130 to the image acquisition device 120, e.g., to avoid the IR light to interfere directly with the image acquisition device 120. As illustrated in FIG. 1B, the light barrier 152 can be a donut-like shape and surround the image acquisition device 120. In some examples, the light barrier 152 is made of a black material attached or formed on an area between the image acquisition device 120 and the first illuminator 130.

In some embodiments, as illustrated in FIG. 1A, the system 100 includes a depth sensor 160. The depth sensor 160 can be arranged on a bottom of the system 100 or any other location in the system 100. The depth sensor 160 can be configured to detect a distance between a subject (e.g., a face of the subject) and the image acquisition device 120. The distance can be used as the subject distance. The system 100 can adjust, based on the subject distance, one or more parameters or characteristics of the image acquisition device 120 (e.g., camera exposure or gain) or one or more parameters or characteristics of the illuminator 130 or 140 (e.g., an illuminance strength) for red eye detection. In some examples, the system 100 can use the red eye detection system 150 to capture a stack of images with different exposure/gain/light settings to ensure that a red eye reflection is not missed from a live subject.

In some embodiments, as illustrated in FIG. 1A, the system 100 includes a display device 110, e.g., a light crystal display (LCD) or a high definition display device, arranged adjacent to the image acquisition device 120, e.g., below the red eye detection system 150. The display device 110 can present a user interface (UI). In some examples, the captured image(s) can be processed to identify/authenticate valid users, and/or permit or deny access to the services/products being offered through the kiosk. For example, the display device 110 can include a capacitive touch screen that allows a user to select and order food at a retail outlet. Once the user completes the selection via user interfaces presented on the display device 110, the user can be asked to look towards the image acquisition device 120 for authentication. The images captured using the image acquisition device 120 can then be used to authenticate/identify a pre-stored profile for the user, and the payment for the food can then be automatically deducted from an account linked to the profile. The display device 110 can also present a result of a red eye detection and/or a result of an authentication on the display device 110. In some embodiments, a brightness of the display device 110 can be adapted by changing the UI to avoid pupil constriction that reduces a red eye effect. A darker UI can be used to reduce the pupil contraction due to the brightness of the display device 110 and thus improve the red eye intensity in the captured image. Also, the display device 110 can absorb the IR and reflect back almost nothing resulting in a black screen in the IR spectrum. Thus, anything on the screen is invisible in IR.

In some embodiments, as illustrated in FIG. 1C, the system 100 includes one or more processing devices 170 that can be connected to the display device 110, the image acquisition device 120, the illuminators 130, 140, and the depth sensor 160. The image acquisition device 120 can include an image sensor 122 that can detect and convey the information that constitutes an image. Types of image sensors include, for example, complementary metal-oxide-semiconductor (CMOS) and charge-coupled devices (CCD). The one or more processing devices 170 can control illuminations of the spatially separated illuminators 130 and 140, drive the display device 110, and process information from the depth sensor 160. The biometric authentication system can be implemented by the one or more processing devices 170.

Images captured using the image acquisition device 120 or any other image acquisition device (e.g., a RGB camera) in the system 100 can be processed by the biometric authentication system to identify/authenticate the user. In some embodiments, the biometric authentication system can extract from the images, various features, such as features derived from the face, iris, vasculature underlying the sclera of the eye, or the periocular region, and so forth, to identify/authenticate a particular user based on matching the extracted features to that of one or more template images stored for the user during an enrollment process. The biometric authentication system can use a machine-learning process (e.g., a deep learning process implemented, for example, using a deep neural network architecture) to match the user to one of the many templates stored for various users of the system. In some embodiments, the machine-learning process can be implemented, at least in part, using one or more processing devices deployed on the system 100. In some embodiments, the system 100 can communicate with one or more remote processing devices (e.g., one or more remote servers) that implement the machine learning process.

In some embodiments, the images captured using the image acquisition device 120 and any other image acquisition device in the system 100 are used to authenticate/identify/verify a user, and provide access to accounts/privileges associated with the identity of the user. For example, one or more captured images can be analyzed to recognize a user (e.g., using face recognition, eye-print recognition, iris recognition, etc.) using a corresponding underlying biometric authentication process. However, malicious attempts to breach the security of such biometric authentication processes often involve presentation of an alternative representation of a live person (e.g., a photograph or image of the live person printed on paper, or displayed on a high definition display device) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems by red eye detection, thereby improving reliability/security of the systems.

The technology described herein can be used to differentiate between an image of a live person and that of an alternative representation of a live person by analyzing portions of the images that represent the iris, as captured under IR illumination. The iris of a live person includes cavities and raised structures that, when captured by the image acquisition device 120, produce an image that shows the rich texture of the iris. For example, the iris cavities may scatter and/or absorb the IR light and the raised structures may reflect the IR light that is captured by the image sensor 122 of the image acquisition device 120. Such differential absorption/scattering, which results in a large number of features in an image of the iris of a live person, does not occur from the surface of paper or a display device. Accordingly, such features are not present in images of alternative representations of the live person captured under IR illumination, and this can therefore be used to differentiate between an image of a live person and an image of an alternative representation of a live person. Such features include edges or areas that have a marked change in pixel intensity. In other words, the iris portions of IR images of a live person are likely to exhibit a large number of high-frequency components, whereas such high frequency components are likely to be absent in IR images of alternative representations.

The presence/absence of high frequency components in an IR image can be detected, for example, using various image processing techniques. In some embodiments, an edge detection process can be executed on a captured IR image, and the number of edges present in the iris portion of the image can be used to determine whether or not the image is that of a live person. In some embodiments, the captured IR image (with or without a pre-processing step such as edge detection) can be subjected to a frequency domain transformation, and an amount of energy present in the high-frequency regions corresponding to the iris portions can be used to determine whether the image corresponds to that of a live person. For example, the annular iris portion can be extracted from the IR image, unwrapped into a rectangular image, and then subjected to a frequency domain transform such as a two-dimensional Fast Fourier Transform (2D-FFT) or a wavelet transform. The amount of energy in the high frequency portions of the resulting frequency domain representation can then be used to determine whether or not the image corresponds to that of a live person. For example, if the high-frequency regions of the frequency domain representations include more than a threshold fraction (e.g., about 60%) of the total amount of energy of the iris image, the IR image can be determined to be from a live person.

FIGS. 2A-2G illustrate captured and processed images of a process of managing red eye detection in accordance with one or more embodiments of the present disclosure. The process is performed by a system, e.g., the system 100 of FIGS. 1A-1C. The system includes a red eye detection system, e.g., the red eye detection system 150 of FIGS. 1A-1B. The red eye detection system includes an image acquisition device, e.g., the image acquisition device 120 of FIGS. 1A-1C, and first and second illuminators, e.g., the first and second illuminators 130, 140 of FIGS. 1A-1C. The first illuminator is arranged closer to the image acquisition device than the second illuminator. In some examples, the first and second illuminators are IR illuminators, e.g., IR LEDs, and the image acquisition device is an IR camera. The system also includes at least one processor, e.g., the one or more processing devices 170 of FIG. 1C, that are configured to process captured images.

First, a plurality of images, e.g., IR images, are sequentially captured by the image acquisition device. The images are captured within a short time period, e.g., less than 1 ms such as 10 μs, such that a face of a subject does not move or moves slightly.

Figures 2C, 2D:
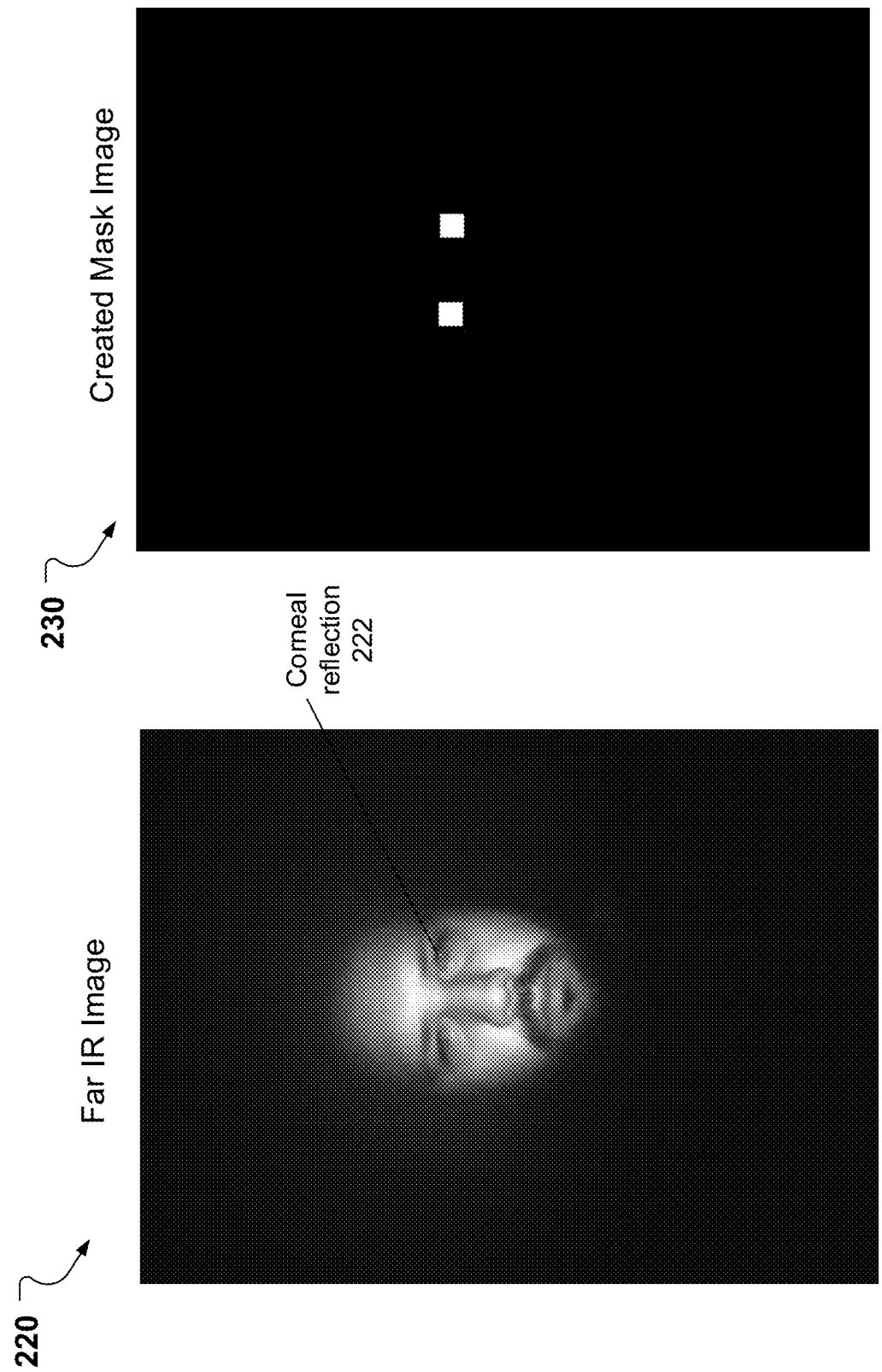

FIG. 2A shows a background image 200 captured by the image acquisition device when the first illuminator and the second illuminator are both off. FIG. 2B shows a first facial image 210 of a subject captured by the image acquisition device when the first illuminator is on and the second illuminator is off. The subject wears no glasses and faces the image acquisition device. The first facial image 210 includes a red eye reflection 212 in eyes of the subject. FIG. 2C shows a second facial image 220 of the subject captured by the image acquisition device when the first illuminator is off and the second illuminator is on. The second facial image 220 includes a corneal reflection 222 in the eyes of the subject. The first facial image 210 also includes a corneal reflection in the eyes of the subject. The red eye reflection 212 is substantially stronger than the corneal reflection such that the corneal reflection is hard to identify in the FIG. 2B.

Second, the processor processes the second facial image, e.g., using a face landmark detection model, to identify eye centers of the eyes on the second facial image and generate a mask image 230, as shown in FIG. 2D, using the eye centers. Each white box in the mask image 230 represents an eye center of a corresponding eye.

Third, the processor processes the first facial image by subtracting the first facial image with the background image and the second facial image. Then, the processor performs an image threshold operation, e.g., Otsu's threshold operation, on the subtracted first image to get a first processed image 240, as shown in FIG. 2E. The first processed image 240 is a black and white image. The image threshold operation is configured to highlight red eye reflection information even if the red eye reflection is faint or weak. It is shown that the first processed image 240 contains both red eye regions and non-red eye regions.

Fourth, the processor applies the mask image 230 on the first processed image 240 to get rid of the non-red eye regions to therefore obtain a second processed image 250, as shown in FIG. 2F.

Fifth, the processor performs a morphological operation on the second processed image 250 to reduce noise to obtain a third processed image 260, as shown in FIG. 2G. The morphological operation includes at least one of an erosion operation or a dilation operation.

Sixth, the processor processes the third processed image 260 to determine whether the subject is a live person or a spoof. To make the decision, the processor first calculates potential points (corresponding to potential white pixels areas) that are close to the eye centers. Only an area including the potential points less than a threshold, e.g., 50 pixels, is considered as an eye region. Any area including the potential points with more than the threshold is considered as a non-eye region. The processor processes the eye regions in left eye and right eye separately. If one of the eyes has no potential points and the other eye has the potential points, only the other eye is considered for decision making.

The processor is configured to make a decision using the following parameters: a ratio of total white pixels and total black pixels in the third processed image 260 and an angle between the potential points. The ratio of the total white pixels and the total black pixels is low for a live person and high for a spoof. For the angle between the potential points, an angle between the eye centers in the mask image 230 is calculated as a reference angle and then angles between all the potential points found in the third processed image 260 are calculated. A pair of points with the angle equal to or close to the reference angle are identified as the red eye centers. If only one eye is used, then the potential points closer to the eye center in the mask image 230 are identified as the red eye center. If no points are found in any of the eyes, the processor can raise a "quality issue" signal to the subject and make no decision.

The processor can be configured to determine that the subject is live if the following criteria are met: i) the ratio of total white pixels and total black pixels in the third processed image is lower than a threshold, e.g., less than 0.04 for each eye, that can be determined from data collected during testing; ii) the angle between the eye centers is close to the reference angle (e.g., within +3 degrees). If only one eye is used, the potential point is close to the eye center in the mask image 230. The processor can be configured to determine that the subject is a spoof if the ratio of total white pixels and total black pixels in the third processed image 260 is higher than a threshold, e.g., more than 0.10 for each eye. If the processor cannot identify the subject as a live person or a spoof, the processor determines the first facial image falls under a quality issue category.

In some embodiments, the processor is configured to determine whether at least one eye is live using a machine learning model based on the third processed image 260 as shown in FIG. 2G.

Figure 3B:
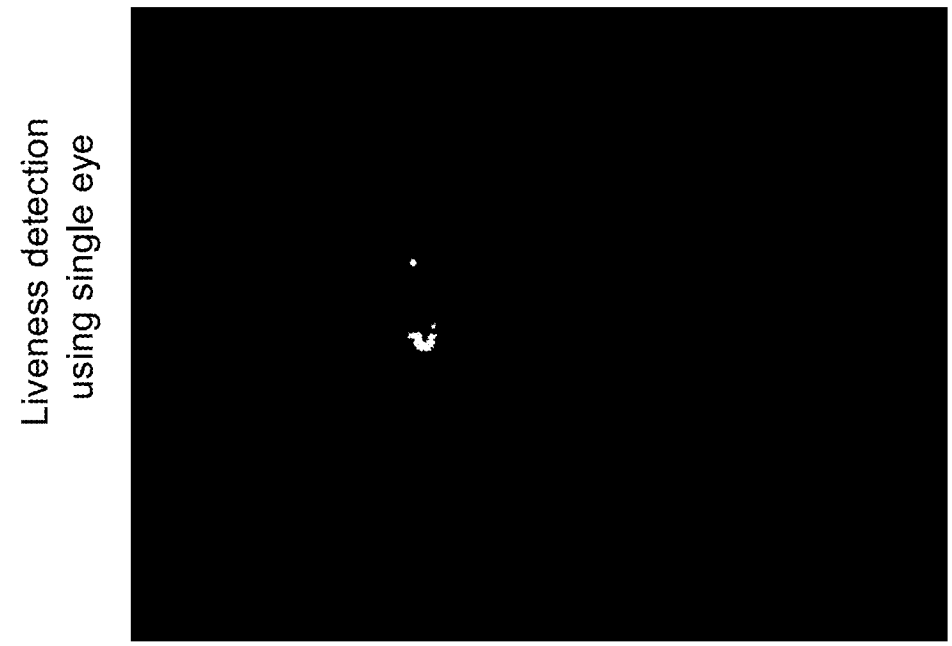
FIGS. 3A-3B illustrate processed images for liveness detection using both eyes (FIG. 3A) and a single eye (FIG. 3B) in accordance with one or more embodiments of the present disclosure.
Figure 3A:
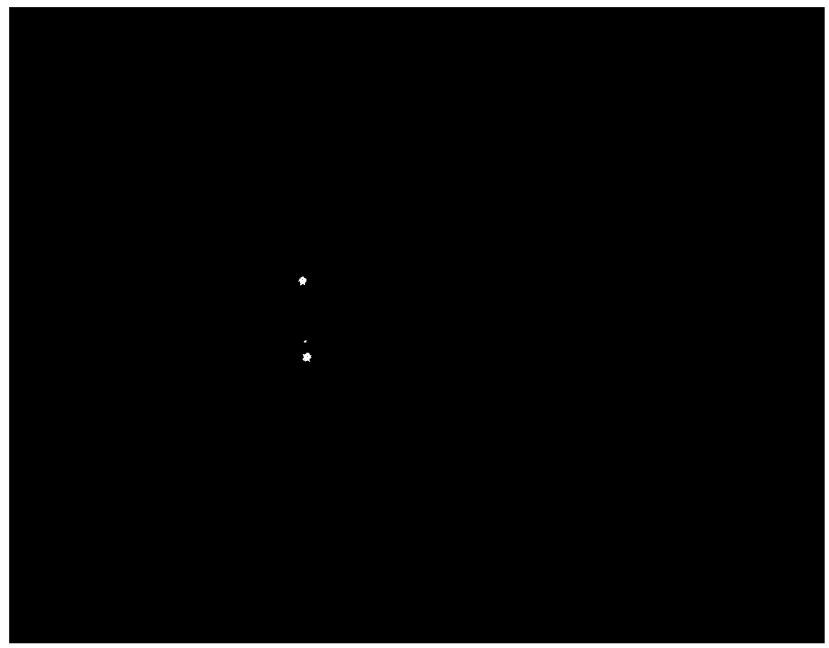

FIG. 3A illustrates a processed image 300 for liveness detection using both eyes. The processed image 300 clearly shows each eye includes a corresponding red eye region. In comparison, FIG. 3B shows a processed image 350 that includes no red eye region in the left eye and a red eye region in the right eye, as the potential points in the left eye are more than a predetermined threshold, e.g., 50 pixels. Thus, only the right eye can be used for liveness detection.

FIGS. 4A-4C illustrate captured and processed images of spoofing with a facial mask in accordance with one or more embodiments of the present disclosure. FIG. 4A shows a far IR image 400 captured by the image acquisition device of FIGS. 2A-2G when the first illuminator is off and the second illuminator is on. FIG. 4B shows a near IR image 430 captured by the image acquisition device when the first illuminator is on and the second illuminator is off. FIG. 4C shows a final processed image 450 according to the process illustrated in FIGS. 2D-2G. The final processed image 450 corresponds to the third processed image 260. It is shown that the potential points are uniformly distributed. The final processed image 450 can be used to determine that the facial mask is a spoof.

FIGS. 5A-5C illustrate captured and processed images of a live person with glasses in accordance with one or more embodiments of the present disclosure. FIG. 5A shows a far IR image 500 captured by the image acquisition device of FIGS. 2A-2G when the first illuminator is off and the second illuminator is on. FIG. 5B shows a near IR image 530 captured by the image acquisition device when the first illuminator is on and the second illuminator is off. FIG. 5C shows a final processed image 550 according to the process illustrated in FIGS. 2D-2G. The final processed image 550 corresponds to the third processed image 260. Reflections from eye glasses can interfere with the red eye effect. The final processed image 550 shows that the red eye detection system used here can identify and reduce such reflections, which can be still used to determine liveness.

In comparison, FIGS. 6A-6C illustrate captured and processed images of spoofing with facial mask and glasses in accordance with one or more embodiments of the present disclosure. FIG. 6A shows a far IR image 600 captured by the image acquisition device of FIGS. 2A-2G when the first illuminator is off and the second illuminator is on. FIG. 6B shows a near IR image 630 captured by the image acquisition device when the first illuminator is on and the second illuminator is off. FIG. 6C shows a final processed image 650 according to the process illustrated in FIGS. 2D-2G. The final processed image 650 corresponds to the third processed image 660. The final processed image 650 shows that the points are uniformly distributed in the eye centers, and the processor can determine spoofing based on the final processed image 650.

Figure 7:
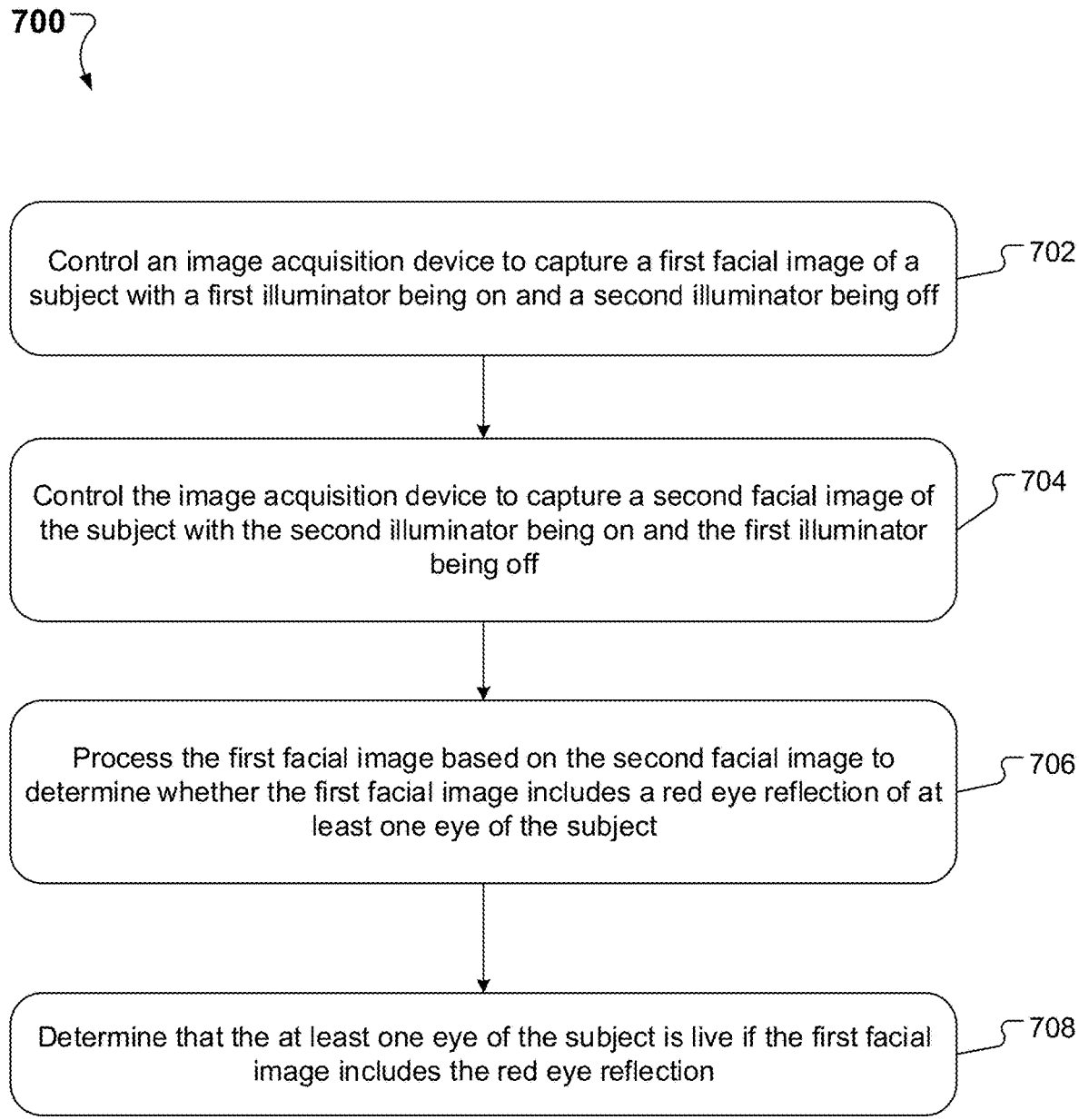
FIG. 7 is a flowchart of an example process for managing red eye detection in accordance with one or more embodiments of the present disclosure.

FIG. 7 is a flowchart of an example process 700 for managing red eye detection in accordance with one or more embodiments of the present disclosure. The process can be performed by a system, e.g., the system 100 of FIGS. 1A-1C. The system can be a kiosk device for facial authentication or a mobile device. The process 700 can be employed within a biometric authentication system deployed on the system. The system includes a red eye detection system, e.g., the red eye detection system 150 of FIGS. 1A-1B. The red eye detection system includes an image acquisition device, e.g., the image acquisition device 120 of FIGS. 1A-1C, and first and second illuminators, e.g., the first and second illuminators 130, 140 of FIGS. 1A-1C. In some examples, the first and second illuminators are IR illuminators, e.g., IR LEDs, and the image acquisition device is an IR camera. The system also includes at least one processor, e.g., the one or more processing devices 170 of FIG. 1C, that are configured to process captured images. The processor can be also configured to control the image acquisition device and the illuminators. In some embodiments, at least a portion of the process can be executed at the processor.

At 702, the processor controls an image acquisition device to capture a first facial image of a face of a subject with a first illuminator being on and a second illuminator being off. At 704, the processor controls the image acquisition device to capture a second facial image of the face of the subject with the second illuminator being on and the first illuminator being off. The first facial image and the second facial image can be sequentially captured by the image acquisition device within a predetermined time period, e.g., less than 1 ms.

The first illuminator and the second illuminator can be arranged with first and second distances away from the image acquisition device. The second distance can be larger than the first distance. The first distance and the second distance are configured such that the first facial image can include a red eye reflection of at least one eye of the subject if the subject is a live person or include little or include no red eye reflection if the subject is a spoof alternative representation, and the second facial image includes little or zero red eye reflection of eyes of the subject no matter whether the subject is a live person or a spoof.

In some embodiments, a subject distance between the face of the subject and the image acquisition device is determined, e.g., by a depth sensor such as the depth sensor 160 of FIGS. 1A and 1C. The red eye detection system is configured such that a first ratio between the first distance and the subject distance is smaller than a predetermined value, and a second ratio between the second distance and the subject distance is larger than the predetermined value. The predetermined value can be about 1/20 or less.

The depth sensor can be configured to detect the subject distance between the face of the subject and the image acquisition device when the image acquisition device captures a facial image of the subject. The processor can be configured to adjust at least one of one or more parameters of the image acquisition device or one or more parameters of the first illuminator based on the subject distance, such that an intensity of a red eye reflection in the first facial image is beyond a predetermined threshold. The one or more parameters of the image acquisition device can include an exposure time or a gain, and the one or more parameters of the first illuminator can include an intensity of light emitted from the first illuminator.

In some embodiments, the system further includes a display device presenting a user interface. The processor can be configured to adjust a brightness of the user interface such that an intensity of the red eye reflection of the at least one eye of the subject in the first facial image satisfies a predetermined threshold condition. The processor can be configured to control the brightness of the user interface based on at least one of: the subject distance or an intensity of a red eye reflection in a previous first facial image.

Each of the first and second facial images can include a respective corneal reflection corresponding to the at least one eye. The system can be configured such that the red eye reflection is substantially stronger than the respective corneal reflection in the first facial image, e.g., by adjusting the one or more parameters of the image acquisition device, the one or more parameters of the first illuminator, and/or the brightness of the user interface presented on the display device.

In some embodiments, the processor can determine an intensity of a red eye reflection in the first facial image and adjust at least one of the one or more parameters of the image acquisition device or the one or more parameters of the first illuminator based on the determined intensity of the red eye reflection in the first facial image. The processor can control the image acquisition device and the first illuminator to capture a new facial image based on the adjusted at least one of the one or more parameters of the image acquisition device or the one or more parameters of the first illuminator.

In some embodiments, each of the first and second facial images includes an image of a portion of the face of the subject, the portion including the at least one eye. In some embodiments, each of the first and second facial images is captured when the subject wears a face mask with the at least one eye being uncovered. In some embodiments, the system further includes a temperature sensor configured to detect a temperature of the subject.

The processor can control the image acquisition device to capture a background image of the face of the subject with the first illuminator being off and the second illuminator being off. The processor can be configured to control the image acquisition device, the first illuminator, and the second illuminator, such that the background facial image, the first facial image and the second facial image are sequentially captured within the predetermined time period. Before processing the first facial image, the processor can register the background facial image and the second facial image with respect to the first facial image, e.g., in a coordinate system. In some implementations, a second, finer grain registration is repeated focusing on the eye regions to improve an accuracy of the registration.

At 706, the processor processes the first facial image based on the second facial image to determine whether the first facial image includes a red eye reflection of at least one eye of the eyes of the subject. At 708, if the first facial image includes a red eye reflection, the processor determines that the at least one eye is live. The processor can generate a red eye detection image, e.g., the third processed image 260 of FIG. 2G, 300 of FIG. 3A, 350 of FIG. 3B, 450 of FIG. 4C, 550 of FIG. 5C, or 650 of FIG. 6C. The processor can determine whether the at least one eye is live based on the red eye detection image.

In some embodiments, the processor processes the first facial image by subtracting the background facial image and the second facial image from the first facial image and performing an image threshold operation on the subtracted first facial image to obtain a first processed image, e.g., the processed image 240 of FIG. 2E. The image threshold operation can include an Otsu's threshold operation or any other threshold operation for increasing a signal to noise ratio for the red eye detection.

The processor can then use a mask image, e.g., the image 230 of FIG. 2D, on the first processed image to eliminate other non-eye-center regions to thereby generate a second processed image, e.g., the image 250 of FIG. 2F. The mask image can include a reference eye center region corresponding to the eye center of the at least one eye of the subject. In some embodiments, the processor generates the mask image based on the second facial image. In some embodiments, the processor generates the mask image based on a third facial image, e.g., an RGB facial image, in a visible range captured by a second image acquisition device, e.g., an RGB camera, in the predetermined time period. The processor can process the third facial image to identify an eye center of the at least one eye of the subject and generate the mask image. The processor can be configured to register the first, second, and third facial images in the same coordinate system.

In some embodiments, the processor can perform a morphological operation on the second processed image to reduce noise in the second processed image to thereby obtain a third processed image, e.g., the processed image 260 of FIG. 2G. The morphological operation can include at least one of an erosion operation or a dilation operation. The third processed image can be used as the red eye detection image.

In some embodiment, the red eye detection image is a binary image, the at least one eye includes a left eye and a right eye, and the reference eye center region includes a reference left eye center region corresponding to the left eye and a reference right eye center region corresponding to the right eye. The processor can determine a left white pixel area close to a left eye center region in the red eye detection image that corresponds to the left reference eye center region, determine a right white pixel area close to a right eye center region in the red eye detection image that corresponds to the right reference eye center region, and determine whether each of the left and right white pixel areas has a size smaller than a predetermined size threshold. If a white pixel area has a size smaller than the predetermined size threshold, the processor can determine that the white pixel area can be used to determine there is a red eye reflection. If a white pixel area has a size larger than the predetermined size threshold, the processor can determine the white pixel area to be useless.

In some embodiments, in response to determining that only one of the left and right white pixel areas is usable for authenticating the subject, the processor can determine whether a corresponding eye of the left and right eyes is live based on whether the one of the left and right white pixel areas matches with a corresponding one of the left and right eye center regions.

In some embodiments, in response to determining that each of the left and right white pixel areas has the size smaller than the predetermined threshold, the processor can determine a ratio of a total number of white pixels in the left and right white pixel areas and a total number of black pixels in the red eye detection image. The processor can determine whether the ratio is smaller than a predetermined ratio threshold.

In some embodiments, the processor can also determine a red eye detection angle between the left and right white pixel areas, determine a reference angle between the reference left eye center region and the reference right eye center region in the mask image, and determine whether the left and right eyes of the subject are live based on whether the red eye detection angle matches the reference angle.

In some embodiments, the processor determines that the eyes of the subject are live in response to determining that the ratio is smaller than the predetermined ratio threshold and the red eye detection angle matches the reference angle. The processor can determine that the eyes of the subject are not live in response to determining at least one of the ratios being no smaller than the predetermined ratio threshold or the red eye detection angle mismatching the reference angle.

In some embodiments, the processor initiates an authentication process for the subject if the first facial image includes the red eye reflection. The processor can determine whether the first facial image includes the red eye reflection based on the red eye detection image. If the first facial image includes the red eye reflection, the processor can determine that the at least one eye is live. The processor can also directly determine whether the at least one eye is live using a machine learning model based on the red eye detection image. In response to determining that the at least one eye of the subject is live, the processor can initiate the authentication process for the subject. The processor can authorize the subject to make a payment in response to determining that the subject is authenticated.

In some embodiments, the processor determines whether the subject is authenticated at least partially based on one or more other facial landmarks of the face of the subject, e.g., after determining that the at least one eye of the subject is live. The processor can use the first facial image (or the second facial image) or an RGB facial image of the face of the subject to determine the one or more other facial landmarks.

In some embodiments, the processor can control the image acquisition device to capture a third image when the first illuminator is on and the second illuminator is off. The processor can determine that the third image includes a first image portion corresponding to a first face of a first subject and a second image portion corresponding to a second face of a second subject. The first image portion including a first red eye reflection corresponds to the first face of the first subject and the second image portion including a second red eye reflection corresponds to the second face of the subject. The processor can generate a corresponding red eye detection image based on the third image. The corresponding red eye detection image can include a first red eye center portion corresponding to the first red eye reflection and second red eye center portion corresponding to the second red eye reflection. If the first red eye center portion is larger than the second red eye center portion, the processor can determine the first subject to be a target subject for authentication. The processor can further determine the first subject to be the target subject in response to determining at least one of: the first red eye center portion being larger than a predetermined threshold, or an angle of eye centers of the first red eye center portion being smaller than a reference angle.

Figure 8:
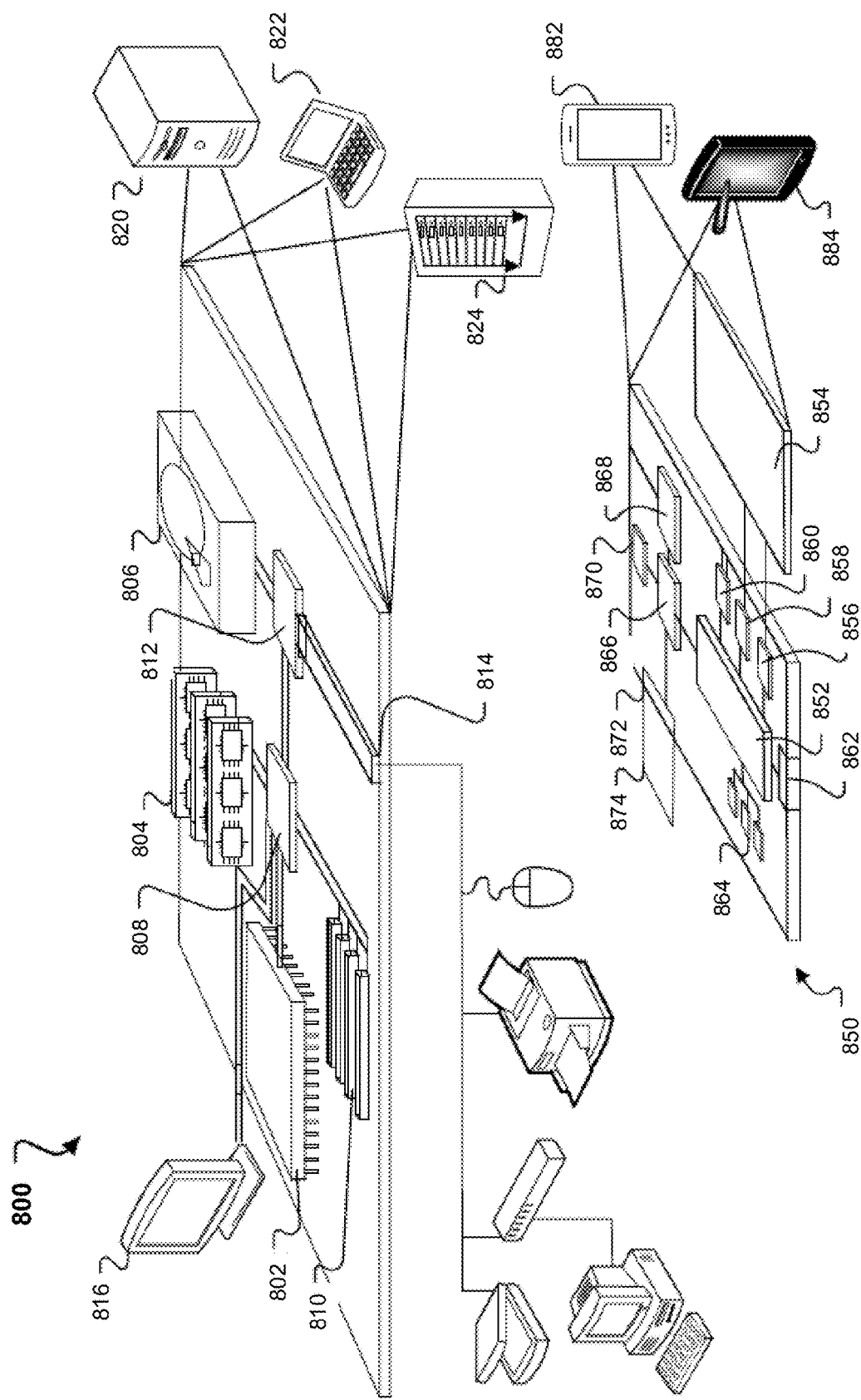
FIG. 8 is a block diagram representing examples of computing devices in accordance with one or more embodiments of the present disclosure.

FIG. 8 shows an example of a computing device 800 and a mobile device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 800 includes a processor 802, memory 804, a storage device 806, a high-speed controller 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, and so forth) and may also include sound generated by applications operating on device 850.

The computing device 850 may be implemented in a number of different forms, as shown in the figure. For example, it may be implemented as a cellular telephone. It may also be implemented as part of a smartphone 882, personal digital assistant, tablet computer 884, or other similar mobile device.

Figure 9:
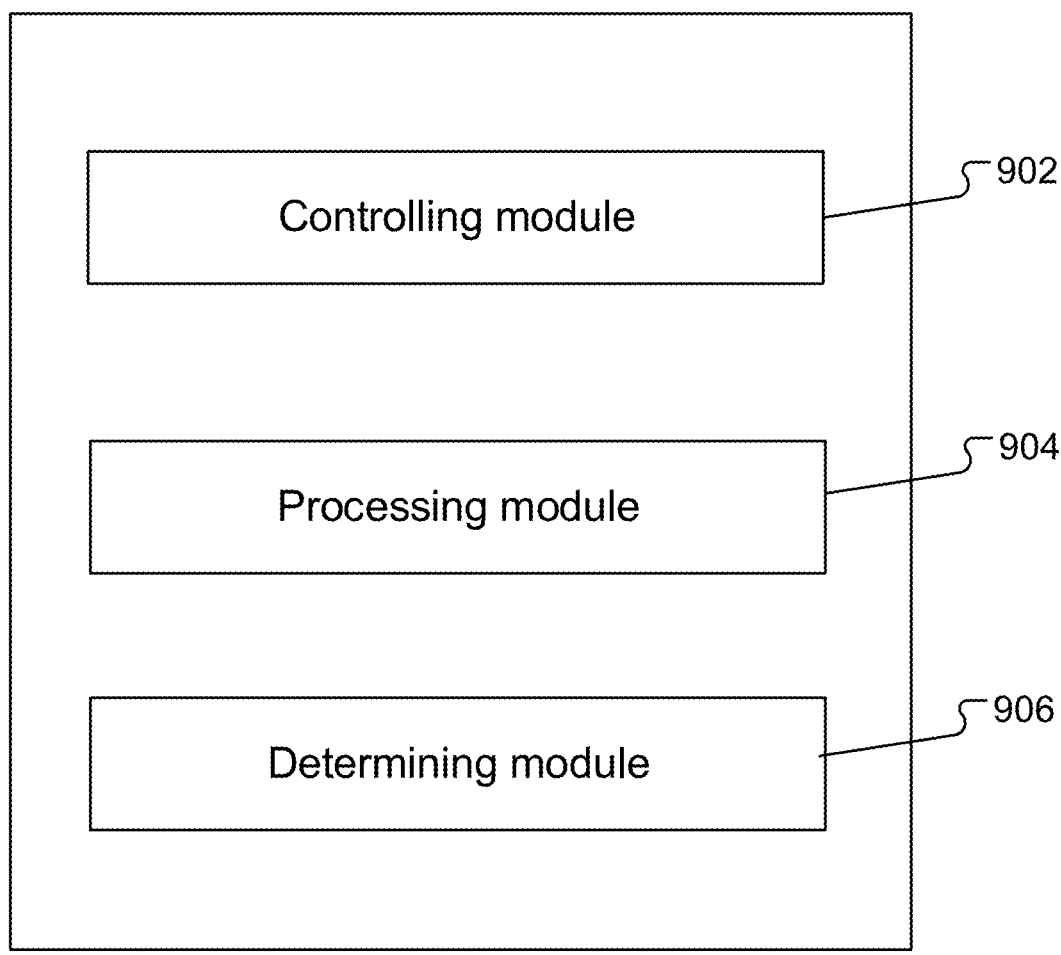
FIG. 9 depicts examples of modules of an apparatus in accordance with one or more embodiments of the present disclosure.

FIG. 9 depicts examples of modules of an apparatus 900 in accordance with one or more embodiments of the present disclosure. The apparatus 900 can be an example of an embodiment of a system configured to manage red eye detection. The apparatus 900 can correspond to the embodiments described above, and the apparatus 900 includes the following: a controlling module 902 that controls an image acquisition device to capture a first facial image of a face of a subject with a first illuminator being on and a second illuminator being off and controls the image acquisition device to capture a second facial image of the face of the subject with the second illuminator being on and the first illuminator being off; a processing module 904 that processes the first facial image based on the second facial image to determine that the first facial image includes a red eye reflection of at least one eye of the subject; and a determining module 906 that determines that the at least one eye of the subject is live in response to determining that the first facial image comprises the red eye reflection of the at least one eye of the subject. The first illuminator and the second illuminator are arranged with first and second distances away from the image acquisition device, and the second distance is larger than the first distance. At least one of the first facial image or the second facial image can be an ocular image or an image of a part of the face including the at least one eye.

In some embodiments, the apparatus 900 includes an initiating module that initiates an authentication process for the subject in response to determining that at least one eye of the subject is live.

In some embodiments, the controlling module 902 controls the image acquisition device to capture a third image with the first illuminator being off and the second illuminator being off. Processing the first facial image based on the second facial image can include subtracting a sum of the second facial image and the third facial image from the first facial image.

In some embodiments, the processing module 904 processes the first facial image based on the second facial image by at least one of: performing an image threshold operation on the processed first facial image to get a binary image, obtaining a mask image including a reference eye center region corresponding to the at least one eye of the subject and eliminating at least one non-eye-center region in the processed first facial image using the mask image, or performing a morphological operation on the processed first facial image to reduce noise.

In some embodiments, the apparatus 900 includes a generating module that generates a red eye detection image based on the first facial image. The determining module 906 determines that the at least one eye of the subject is live by determining that the first facial image comprises the red eye reflection of the at least one eye of the subject based on the red eye detection image.

In some embodiments, the red eye detection image is a binary image. The at least one eye includes a left eye and a right eye, and the reference eye center region includes a reference left eye center region corresponding to the left eye and a reference right eye center region corresponding to the right eye. The determining module 906 can determine that the at least one eye of the subject is live by determining a left white pixel area close to a left eye center region in the red eye detection image that corresponds to the left reference eye center region, determining a right white pixel area close to a right eye center region in the red eye detection image that corresponds to the right reference eye center region, and determining that at least of the left and right white pixel areas has a size smaller than a predetermined size threshold.

In some embodiments, the determining module 906 determines that the at least one eye of the subject is live by determining that a corresponding eye of the left and right eyes is live in response to determining that only one of the left and right white pixel areas has the size smaller than the predetermined size threshold and that the one of the left and right white pixel areas matches with a corresponding one of the left and right eye center regions.

In some embodiments, the determining module 906 determines that the at least one eye of the subject is live by: in response to determining that each of the left and right white pixel areas has the size smaller than the predetermined threshold, determining a ratio of a total number of white pixels in the left and right white pixel areas and a total number of black pixels in the red eye detection image, determining that the ratio is smaller than a predetermined ratio threshold, determining a red eye detection angle between the left and right white pixel areas, determining a reference angle between the reference left eye center region and the reference right eye center region in the mask image, and determining that the left and right eyes of the subject are live in response to determining that the red eye detection angle matches the reference angle.

In some embodiments, at least one of the first facial image or the second facial image can be an ocular image or an image of a part of the face including the at least one eye.

In some embodiments, the image acquisition device includes an infrared camera, and the first illuminator includes at least one first infrared light emitting element configured to emit light in an infrared range, and the second illuminator comprises at least one second infrared light emitting element configured to emit light in the infrared range.

In some embodiments, the controlling module 902 controls a second image acquisition device to capture a third facial image of the subject with a third illuminator being on and the first and second illuminators being off, the third facial image being in the visible range. The processing module 904 processes the third facial image to identify an eye center of at least one eye of the subject. The generating module generates a mask image including a reference eye center region corresponding to the eye center of the at least one eye of the subject.

In some embodiments, the processing module 904 processes the first facial image based on the second facial image by determining that the face and/or the at least one eye of the subject is in motion, registering the second facial image with the first facial image in response to determining that the face and/or the at least one eye of the subject is in motion, and subtracting the registered second facial image from the first facial image.

In some embodiments, the controlling module 902 controls the image acquisition device to capture a third facial image with the first illuminator and the second illuminator being off. The processing module 904 processes the first facial image based on the second facial image by subtracting a sum of the second facial image and the third facial image from the first facial image.

In some embodiments, the controlling module 902 controls the image acquisition device, the first illuminator, and the second illuminator, such that the first facial image, the second facial image, and the third facial image are sequentially captured within a predetermined time period.

In some embodiments, a light barrier is arranged between the image acquisition device and the first illuminator and configured to block light emitted from the first illuminator to the image acquisition device.

In some embodiments, a depth sensor is configured to detect a subject distance between the face of the subject and the image acquisition device. The controlling module 902 adjusts one or more parameters of at least one of the image acquisition device or the first illuminator based on the subject distance.

In some embodiments, a first ratio between the first distance and a subject distance between the face of the subject and the image acquisition device is smaller than a predetermined ratio, and a second ratio between the second distance and the subject distance is larger than the predetermined ratio.

In some embodiments, a display device presents a user interface. The controlling module 902 adjusts a brightness of the user interface of the display device to thereby control a pupil dilation such that an intensity of the red eye reflection of the at least one eye of the subject in the first facial image satisfies a predetermined threshold condition. In some embodiments, an ambient light sensor detects a bright environment that can reduce the red eye effect due to pupil constriction, and the detection of the ambient light sensor can be used for algorithm threshold adjustments or issuing a failure to capture.

In some embodiments, the determining module 906 determines that the first facial image comprises the red eye reflection using a trained machine learning model.

In some embodiments, the controlling module 902 controls the image acquisition device to capture a third image when the first illuminator is on and the second illuminator is off. The determining module 906 determines that the third image includes a first image portion corresponding to a first face of a first subject and a second image portion corresponding to a second face of a second subject, determines that the first image portion includes a first red eye reflection in at least one eye of the first subject and the second image portion comprises a second red eye reflection in at least one eye of the second subject, and in response to determining that the first red eye reflection is larger than the second red eye reflection, determines the first subject to be a target subject for authentication.

In some embodiments, the determining module 906 determines whether the subject is authenticated at least partially based on one or more other facial landmarks of the face of the subject.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification the term "engine" is used broadly to refer to a software-based system, subsystem that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system comprising:
an image acquisition device including an image sensor;
a first illuminator arranged at a first distance from the image acquisition device;
a second illuminator arranged at a second distance from the image acquisition device, the second distance being larger than the first distance, wherein the image acquisition device is configured to capture (i) a first facial image of a face of a subject with the first illuminator being on and the second illuminator being off, (ii) a second facial image of the face of the subject with the second illuminator being on and the first illuminator being off, and wherein a first ratio between the first distance and a subject distance between the face of the subject and the image acquisition device is smaller than a predetermined ratio, and a second ratio between the second distance and the subject distance is larger than the predetermined ratio; and
at least one processor configured to:
determine, based on the first facial image and the second facial image, whether the first facial image comprises a red eye reflection from at least one eye of the subject, and
in response to determining that the first facial image comprises a red eye reflection from at least one eye of the subject, determine that the subject is a live human being.

2. The system of claim 1, wherein the at least one processor is configured to:
process the first facial image based on the second facial image to generate a red eye detection image, and
determine whether the first facial image comprises a red eye reflection from the at least one eye of the subject based on the red eye detection image.

3. The system of claim 2, wherein each of the first and second facial images comprises a respective corneal reflection corresponding to the at least one eye, and
wherein the red eye detection image comprises no information corresponding to the respective corneal reflections of the first and second facial images.

4. The system of claim 2, wherein the image acquisition device is configured to capture a background facial image of the face of the subject with the first illuminator being off and the second illuminator being off, and
wherein the processor is configured to generate the red eye detection image based on the background facial image, the first facial image, and the second facial image.

5. The system of claim 4, wherein the processor is configured to:
control the image acquisition device, the first illuminator, and the second illuminator, such that the background facial image, the first facial image and the second facial image are sequentially captured within a predetermined time period.

6. The system of claim 5, wherein the processor is configured to generate the red eye detection image by
subtracting the background facial image and the second facial image from the first facial image to obtain a first processed image,
performing an image threshold operation on the first processed image to obtain a second processed image,
obtaining a mask image including a reference eye center region corresponding to the at least one eye, and
generating a third processed image based on the second processed image using the mask image to eliminate other non-eye-center regions in the second processed image.

7. The system of claim 6, wherein the processor is configured to generate the mask image based on one of
the second facial image, or
a facial image in a visible range captured by a second image acquisition device including a second image sensor in the predetermined time period.

8. The system of claim 1, wherein the image acquisition device comprises an infrared camera that includes the image sensor,
wherein the first illuminator comprises at least one first infrared light emitting element configured to emit light in an infrared range, and the second illuminator comprises at least one second infrared light emitting element configured to emit light in the infrared range, and
wherein the system further comprises:
a third illuminator that comprises at least one third light emitting element configured to emit light in a visible range; and
a second image acquisition device including a second image sensor configured to capture a third facial image of the subject with the third illuminator being on and the first and second illuminators being off, the third facial image being in the visible range, wherein the processor is configured to process the third facial image to identify an eye center of the at least one eye of the subject and generate a mask image comprising a reference eye center region corresponding to the eye center of the at least one eye of the subject.

9. The system of claim 1, wherein each of the first and second facial images comprises an image of a portion of the subject, the portion including the at least one eye.

10. The system of claim 1, wherein each of the first and second facial images is captured when the subject wears a face mask with the at least one eye being uncovered.

11. The system of claim 1, further comprising at least one of
a temperature sensor configured to detect a temperature of the subject,
a light barrier arranged between the image acquisition device and the first illuminator and configured to block light emitted from the first illuminator to the image acquisition device,
a depth sensor configured to detect a subject distance between a face of the subject and the image acquisition device, wherein the processor is configured to adjust one or more parameters of at least one of the image acquisition device or the first illuminator based on the subject distance, or a display device for presenting a user interface, wherein the processor is configured to adjust a brightness of the user interface on the display device such that an intensity of the red eye reflection of the at least one eye of the subject in the first facial image satisfies a predetermined threshold condition.

12. The system of claim 1, wherein the processor is configured to:
   determine an intensity of the red eye reflection in the first facial image;
   adjust at least one of one or more parameters of the image acquisition device or one or more parameters of the first illuminator based on the determined intensity of the red eye reflection in the first facial image; and
   control the image acquisition device and the first illuminator to capture a third facial image based on the adjusted at least one of the one or more parameters of the image acquisition device or the one or more parameters of the first illuminator.

13. The system of claim 1, wherein the image acquisition device is configured to capture a third image when the first illuminator is on and the second illuminator is off, and wherein the processor is configured to:
   determine that the third image comprises a first image portion corresponding to a first face of a first subject and a second image portion corresponding to a second face of a second subject,
   determine that the first image portion comprises a first red eye reflection in at least one eye of the first subject and the second image portion comprises a second red eye reflection in at least one eye of the second subject, and
   in response to determining that the first red eye reflection is larger than the second red eye reflection, determine the first subject to be a target subject for authentication.

14. The system of claim 1, wherein the processor is configured to:
   in response to determining that the at least one eye of the subject is live, initiate an authentication process for the subject.

15. A method comprising:
   controlling, by at least one processor, an image acquisition device to capture a first facial image of a face of a subject with a first illuminator being on and a second illuminator being off, the first illuminator and the second illuminator being arranged with first and second distances away from the image acquisition device, the second distance being larger than the first distance;
   controlling, by the at least one processor, the image acquisition device to capture a second facial image of the face of the subject with the second illuminator being on and the first illuminator being off, wherein a first ratio between the first distance and a subject distance between the face of the subject and the image acquisition device is smaller than a predetermined ratio, and a second ratio between the second distance and the subject distance is larger than the predetermined ratio;
   determining, by the at least one processor, the first facial image comprises a red eye reflection of at least one eye of the subject based on the first facial image and the second facial image; and
   in response to determining that the first facial image comprises the red eye reflection of the at least one eye of the subject, determining, by the at least one processor, that the at least one eye of the subject is live.

16. The method of claim 15, further comprising: processing the first facial image based on the second facial image by at least one of:
   subtracting a background facial image and the second facial image from the first facial image to obtain a first processed image,
   performing an image threshold operation on the first processed image to get a second processed image,
   obtaining a mask image including a reference eye center region corresponding to the at least one eye of the subject and eliminating at least one non-eye-center region in the second processed image using the mask image to get a third processed image, or
   performing a morphological operation on the third processed image to reduce noise in the third processed image.

17. The method of claim 16, wherein processing the first facial image based on the second facial image comprises generating a red eye detection image based on the first facial image,
   wherein, the at least one eye comprises a left eye and a right eye, and a reference eye center region comprises a reference left eye center region corresponding to the left eye and a reference right eye center region corresponding to the right eye, and
   wherein determining that the at least one eye of the subject is live comprises:
      determining a left white pixel area close to a left eye center region in the red eye detection image that corresponds to the reference left eye center region,
      determining a right white pixel area close to a right eye center region in the red eye detection image that corresponds to the reference right eye center region, and
      determining that at least one of the left and right white pixel areas has a size smaller than a predetermined size threshold.

18. The method of claim 17, wherein determining that the at least one eye of the subject is live comprises:
   in response to determining that only one of the left and right white pixel areas has the size smaller than the predetermined size threshold and that the one of the left and right white pixel areas matches with a corresponding one of the left and right eye center regions, determining that a corresponding eye of the left and right eyes is live.

19. The method of claim 17, wherein determining that the at least one eye of the subject is live comprises:
   in response to determining that each of the left and right white pixel areas has the size smaller than the predetermined size threshold, determining a ratio of a total number of white pixels in the left and right white pixel areas and a total number of black pixels in the red eye detection image,
   determining that the ratio is smaller than a predetermined ratio threshold,
   determining a red eye detection angle between the left and right white pixel areas,
   determining a reference angle between the reference left eye center region and the reference right eye center region in the mask image, and
   determining that the left and right eyes of the subject are live in response to determining that the red eye detection angle matches the reference angle.

20. A non-transitory machine readable storage medium coupled to at least one processor having machine-executable instructions stored thereon that, when executed by the at least one processor, cause the at least one processor to perform operations comprising:
- controlling an image acquisition device to capture a first facial image of a face of a subject with a first illuminator being on and a second illuminator being off, the first illuminator and the second illuminator being arranged with first and second distances away from the image acquisition device, the second distance being larger than the first distance;
- controlling the image acquisition device to capture a second facial image of the face of the subject with the second illuminator being on and the first illuminator being off, wherein a first ratio between the first distance and a subject distance between the face of the subject and the image acquisition device is smaller than a predetermined ratio, and a second ratio between the second distance and the subject distance is larger than the predetermined ratio;
- determining the first facial image comprises a red eye reflection of at least one eye of the subject based on the first facial image and the second facial image; and
- in response to determining that the first facial image comprises the red eye reflection of the at least one eye of the subject, determining that the at least one eye of the subject is live.

* * * * *